United States Patent
Ejiri et al.

(10) Patent No.: US 12,170,733 B2
(45) Date of Patent: Dec. 17, 2024

(54) UTILIZATION MANAGEMENT SYSTEM, MANAGEMENT DEVICE, UTILIZATION CONTROL DEVICE, UTILIZATION MANAGEMENT METHOD, AND COMPUTER-READABLE PROGRAM

(71) Applicant: Bitkey Inc., Tokyo (JP)

(72) Inventors: Yuki Ejiri, Tokyo (JP); Hiroshi Yamamoto, Tokyo (JP)

(73) Assignee: BITKEY INC., Tokyo (JP)

( * ) Notice: Subject to any disclaimer, the term of this patent is extended or adjusted under 35 U.S.C. 154(b) by 608 days.

(21) Appl. No.: 17/424,036

(22) PCT Filed: Dec. 18, 2019

(86) PCT No.: PCT/JP2019/049710
§ 371 (c)(1),
(2) Date: Jul. 19, 2021

(87) PCT Pub. No.: WO2020/153059
PCT Pub. Date: Jul. 30, 2020

(65) Prior Publication Data
US 2022/0103374 A1      Mar. 31, 2022

(30) Foreign Application Priority Data
Jan. 22, 2019   (JP) ................................. 2019-008856

(51) Int. Cl.
*H04L 9/32* (2006.01)
*G06F 21/32* (2013.01)
*H04L 9/08* (2006.01)

(52) U.S. Cl.
CPC .............. *H04L 9/3247* (2013.01); *H04L 9/08* (2013.01); *G06F 21/32* (2013.01)

(58) Field of Classification Search
CPC .......... H04L 9/3247; H04L 9/08; G06F 21/32
(Continued)

(56) References Cited

U.S. PATENT DOCUMENTS

| 11,184,157 B1* | 11/2021 | Gueron ...................... H04L 9/14 |
| 2015/0059003 A1* | 2/2015 | Bouse .................. G06F 16/2379 726/28 |

(Continued)

FOREIGN PATENT DOCUMENTS

| EP | 3 313 047 A1 | 4/2018 |
| JP | 2003-132435 | 5/2003 |

(Continued)

OTHER PUBLICATIONS

International Search Report for PCT/JP2019/049710 mailed Mar. 17, 2020, 4 pages.

(Continued)

*Primary Examiner* — Philip J Chea
*Assistant Examiner* — Ghizlane Maazouz
(74) *Attorney, Agent, or Firm* — Nixon & Vanderhye P.C.

(57) ABSTRACT

According to the present invention, the convenience of a utilization management technology for a usage target object is enhanced and the security risk is reduced. This utilization control device (1) is capable of communicating only in a near field communication (63) and stores a first public key that is paired with a first secret key stored in a management device (2). When hole data is received with a first signature from a provider terminal (3), the first signature is verified by means of the first key, and when the signature verification is established, the hole data is set to an own device (1). The hole data includes a second public key that is paired with a second secret key stored in the management device (2). When a utilization permit card is received with a second signature from a user terminal (4), the second signature is verified with the second public key, and when the signature verification is validated, transaction information included in the utilization permit card is acquired. In addition, with reference to the acquired transaction information, when a (Continued)

condition specified by the transaction information is satisfied, a utilization limit to the object to be utilized (a house (50)) is released.

20 Claims, 21 Drawing Sheets

(58) Field of Classification Search
USPC .......................................................... 713/176
See application file for complete search history.

(56) References Cited

U.S. PATENT DOCUMENTS

| | | | |
|---|---|---|---|
| 2016/0212137 A1* | 7/2016 | Pottier | H04L 63/101 |
| 2017/0236343 A1* | 8/2017 | Leboeuf | G07C 9/20 |
| | | | 340/5.61 |
| 2018/0041484 A1* | 2/2018 | Gifford | H04L 9/3247 |
| 2019/0066417 A1* | 2/2019 | Wang | G07C 9/29 |
| 2020/0028672 A1 | 1/2020 | Tang | |

FOREIGN PATENT DOCUMENTS

| | | |
|---|---|---|
| JP | 2003-233590 | 8/2003 |
| JP | 2017-216596 | 12/2017 |
| JP | 2018-098553 | 6/2018 |
| WO | 2017/006630 | 1/2017 |
| WO | 2018/177188 A1 | 10/2018 |

OTHER PUBLICATIONS

Written Opinion of the International Searching Authority for PCT/JP2019/049710 mailed Mar. 17, 2020, 4 pages.
Extended European Search Report dated Sep. 16, 2022 issued in European Application No. 19911719.3 (10 pages).
Examination Report dated Feb. 2, 2023 issued in Indian Application No. 202147035978 (8 pages).

* cited by examiner

Fig.10

User information storage part 221

| User ID (2211) | Password (2212) | Address information (2213) | Personal information (2214) | |
|---|---|---|---|---|
| A 0 0 0 1 | **** | ***** | ****************** | } 2210 |
| A 0 0 0 2 | **** | ***** | ****************** | } 2210 |
| ⋮ | ⋮ | ⋮ | ⋮ | ⋮ |

Fig.11

Provider information storage part 222

| User ID | Password | Address information | Personal information |
|---------|----------|---------------------|----------------------|
| B 0 0 1 | **** | ***** | ****************** |
| B 0 0 2 | **** | ***** | ****************** |
| ⋮ | ⋮ | ⋮ | ⋮ |

Fig.12

Object data storage part 223

| Object ID (2231) | First public key (2232) | First secret key (2233) | Facility information (2234) | User ID (2235) | |
|---|---|---|---|---|---|
| C 0 0 1 | **** | **** | ****************** | B 0 0 5 | } 2230 |
| C 0 0 2 | **** | **** | ****************** | B 0 0 7 | } 2230 |
| ⋮ | ⋮ | ⋮ | ⋮ | ⋮ | ⋮ |

Fig.13

Hole data storage part 224

| Hole ID | Second public key | Second secret key | Common key | Object ID |
|---|---|---|---|---|
| E 0 0 1 | **** | **** | **** | C 0 0 1 |
| E 0 0 2 | **** | **** | **** | C 0 0 2 |
| ⋮ | ⋮ | ⋮ | ⋮ | ⋮ |

Transaction information storage part 225

| Transaction ID | Object ID | User ID (user) | User ID (provider) | Desire information | User permit obtainable time |
|---|---|---|---|---|---|
| D 0 0 1 | C 0 0 2 | A 0 0 8 | B 0 0 7 | Usable period start time : *****<br>Usable period end time : *****<br>Number of times of use : **** | 2018/12/21<br>9 : 00 ~ |
| D 0 0 2 | C 0 0 1 | A 0 0 5 | B 0 0 5 | Usable period start time : *****<br>Usable period end time : *****<br>Number of times of use : **** | 2018/12/21<br>11 : 00 ~ |
| ⋮ | ⋮ | ⋮ | ⋮ | ⋮ | ⋮ |

Object registration request processing S305

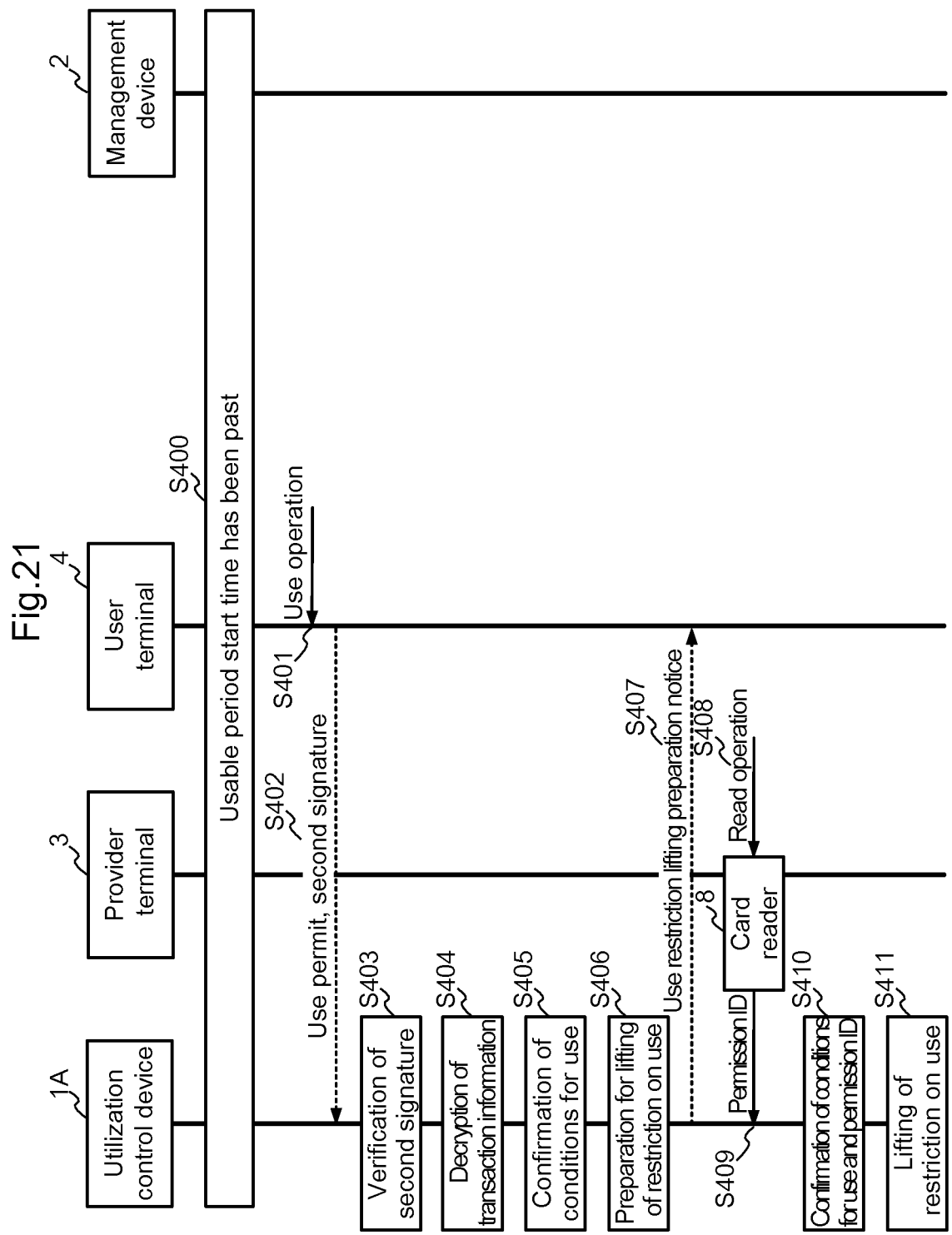

UTILIZATION MANAGEMENT SYSTEM, MANAGEMENT DEVICE, UTILIZATION CONTROL DEVICE, UTILIZATION MANAGEMENT METHOD, AND COMPUTER-READABLE PROGRAM

This application is the U.S. national phase of International Application No. PCT/JP2019/049710 filed Dec. 18, 2019 which designated the U.S. and claims priority to JP Application No. 2019-008856 filed Jan. 22, 2019, the entire contents of each of which are hereby incorporated by reference.

TECHNICAL FIELD

The present invention relates to a utilization management technique for managing use of a usage target object whose use can be limited by locking/unlocking, access control, or encrypting/decrypting. As such a usage target object, it is possible to mention an entrance of a hotel, an inn, a guesthouse, a house, a warehouse, or a room, a moving body such as an automobile or a bicycle, and a browsing terminal for an electronic medium containing an electronic medical record or an electronic book, for example.

BACKGROUND ART

The Patent Literature 1 discloses a system in which, by carrying a room key only, a user can use various services, including locking and unlocking of a room, in a facility such as a corporate facility, a hospital, a game hall, a public facility, or the like. This system comprises: a room key having a Radio Frequency Identification (RFID) tag that can store information such as a room number, a password, customer information, or the like and readable and writable; RFID readers, which are installed at various places of the facility for reading and writing information from and into the RFID tag of the room key; a database, which stores information on rooms and equipment in the facility; and a server, which is connected to the RFID readers and the database via a network and performs management of the rooms and the equipment in the facility. For example, an RFID reader installed at a door or in a room in the facility reads information stored in an RFID tag of a room key and sends the information to the server. Receiving the information, the server compares the room number contained in the information received from the RFID reader with the room number of the room in which the RFID reader is installed, to lock or unlock the room.

CITATION LIST

Patent Literature

Patent Literature 1: Japanese Unexamined Patent Application Laid-Open No. 2003-132435

SUMMARY OF INVENTION

Technical Problem

The system of the Patent Literature 1, however, premises that a room key is lent out and returned at a reception desk of a facility such as a corporate facility, a hospital, a game hall, or a public facility. Therefore, even if a reservation of the facility is made via the Internet, a user of the facility must stop at the reception desk of the management section of the facility in order to borrow a room key before moving to the reserved facility. Further, after using the facility, the user must stop at the reception desk of the management section in order to return the room key. Accordingly, a geographical distance between the reserved facility and the management section managing the facility causes inconvenience to the user.

Further, in the system of the Patent Literature 1, the RFID readers installed at various places of the facility read information stored in the RFID tag of a room key, and send the information to the server via the network. Accordingly, in the case where the server is placed outside the facility and the RFID readers installed at various places inside the facility are connected to the server placed outside the facility via the Internet, read information is transmitted over the Internet each time when an RFID reader reads information from the RFID tag of a room key. This therefore increases the security risk.

The present invention has been made taking the above situation into consideration. An object of the invention is to reduce security risks while improving convenience in a utilization management technique for managing use of a usage target object whose use can be restricted by locking/unlocking, access control, or encrypting/decrypting, the usage target object including an entrance of a hotel, an inn, a guesthouse, a house, a warehouse, or a room, a moving body such as an automobile or a bicycle, and a browsing terminal for an electronic medium containing an electronic health record or an electronic book, for example.

Solution to Problem

To solve the above problems, the present invention provides a utilization control device that controls use of the usage target object by locking/unlocking, access control or encrypting/decrypting based on a use permit; a management device that manages the usage target object by association with the utilization control device; a provider terminal that sets hole data required for verification of the use permit in the utilization control device; and a user terminal that notifies the utilization control device of the use permit.

Here, the utilization control device can communicate only via Near Field Communication, and is separated from a network. Further, the utilization control device stores a first public key that is the pair to a first secret key stored being associated with the utilization control device in the management device. When the utilization control device receives the hole data together with a first signature from the provider terminal via the Near Field Communication, the utilization control device verifies the first signature by using the first public key, and sets the hole data in the utilization control device itself when the verification is established. The hole data includes a second public key that is the pair to a second secret key stored being associated with the utilization control in the management device. Further, when the utilization control device receives the use permit together with a second signature from the user terminal via the Near Field Communication, the utilization control device verifies the second signature by using the second public key, and obtains transaction information included in the use permit when the signature verification is established. Then, the utilization control device refers to the obtained transaction information, and lifts restriction on use of the usage target object when conditions specified by the transaction information are satisfied.

The transaction information included in the use permit may be encrypted by using a common key that the utilization control device shared with the management device. The utilization control device uses the common key to decrypt the encrypted transaction information included in the use permit received from the user terminal. In this case, the common key may be included in the hole data sent to the use control device.

For example, the present invention provides a utilization management system that manages use of a usage target object, comprising:
a utilization control device that controls use of the usage target object by locking/unlocking, access control, or encrypting/decrypting, based on a use permit;
a management device that manages the usage target object by association with the utilization control device;
a provider terminal that sets hole data required for verification of the use permit in the utilization control device; and
a user terminal that notifies the utilization control device of the use permit; wherein
the management device comprises:
a transaction management means that manages transaction information that includes conditions for using the usage target object;
an object management means that manages a first secret key/public key by association with the utilization control device;
a hole management means that manages a second secret key/public key by association with the utilization control device;
a hole data processing means that uses the first secret key managed by the object management means to generate a first signature on the hole data that includes the second public key managed by the hole management means; and sends the hole data and the first signature to the provider terminal; and
a use permit processing means that uses the second secret key managed by the hole management means to generate a second signature on the use permit that includes the transaction information managed by the transaction management means; and sends the use permit and the second signature to the user terminal;
the provider terminal sends the hole data and the first signature received from the management device to the utilization control device via Near Field Communication;
the user terminal sends the use permit and the second signature received from the management device to the utilization control device via the Near Field Communication; and
the utilization control device can communicate only via the Near Field Communication, and comprises
a hole setting means that verifies the first signature received together with the hole data from the provider terminal by using pre-registered the first public key to set the hole data in the utilization control device itself when the verification being established;
a transaction information obtaining means that verifies the second signature received together with the use permit from the user terminal by using the second public key included in the hole data set in the utilization control device itself to obtain the transaction information included in the use permit when the verification being established; and
a lifting means that lifts restriction on use of the usage target object with referring to the transaction information obtained by the transaction obtaining means when conditions specified by the transaction information being satisfied.

Advantageous Effects of Invention

In the present invention, the utilization control device can communicate only via Near Field Communication, and is separated from a network. Accordingly, the utilization control device is not attacked from the outside via a network such as the Internet. Further, the user permit used for lifting the restriction on use of the usage target object is validated by verifying the second signature added to the use permit, by using the second public key included in the hole data. Further, the hole data is validated by verifying the first signature added to the hole data, by using the first public key. Thus, the present invention can reduce security risks.

Further, according to the present invention, the restriction on use of the usage target object is lifted only when the conditions specified by the transaction information included in the use permit are satisfied. When the conditions are not satisfied, the restriction on use of the usage target object is not lifted. Accordingly, by making the transaction information include conditions such as a time limit for use, the number of times of use, and the like, the use permit that does not satisfy these conditions becomes invalid even though it has been authenticated. As a result, it is not necessary for the user of the usage target object (user of the user terminal) to return the user permit. Thus, according to the present invention, convenience is improved.

Thus, according to the present invention, it is possible to improve convenience while reducing security risks in use management technique that can restrict using of a usage target object by locking/unlocking/access control/or encrypting/decrypting.

BRIEF DESCRIPTION OF DRAWINGS

FIG. 10 is a diagram showing schematically an example of contents registered in a user information storage part 221;

FIG. 11 is a diagram showing schematically an example of contents registered in a provider information storage part 222;

FIG. 12 is a diagram showing schematically an example of contents registered in an object data storage part 223;

FIG. 13 is a diagram showing schematically an example of contents registered in a hole data storage part 224;

FIG. 14 is a diagram showing schematically an example of contents registered in a transaction information storage part 225;

FIG. 21 is a sequence diagram showing an example of a use restriction lift operation for a utilization control device 1A to lift restriction on use of a usage target object in the utilization management system's variation shown in FIG. 20.

DESCRIPTION OF EMBODIMENTS

Figure 1:
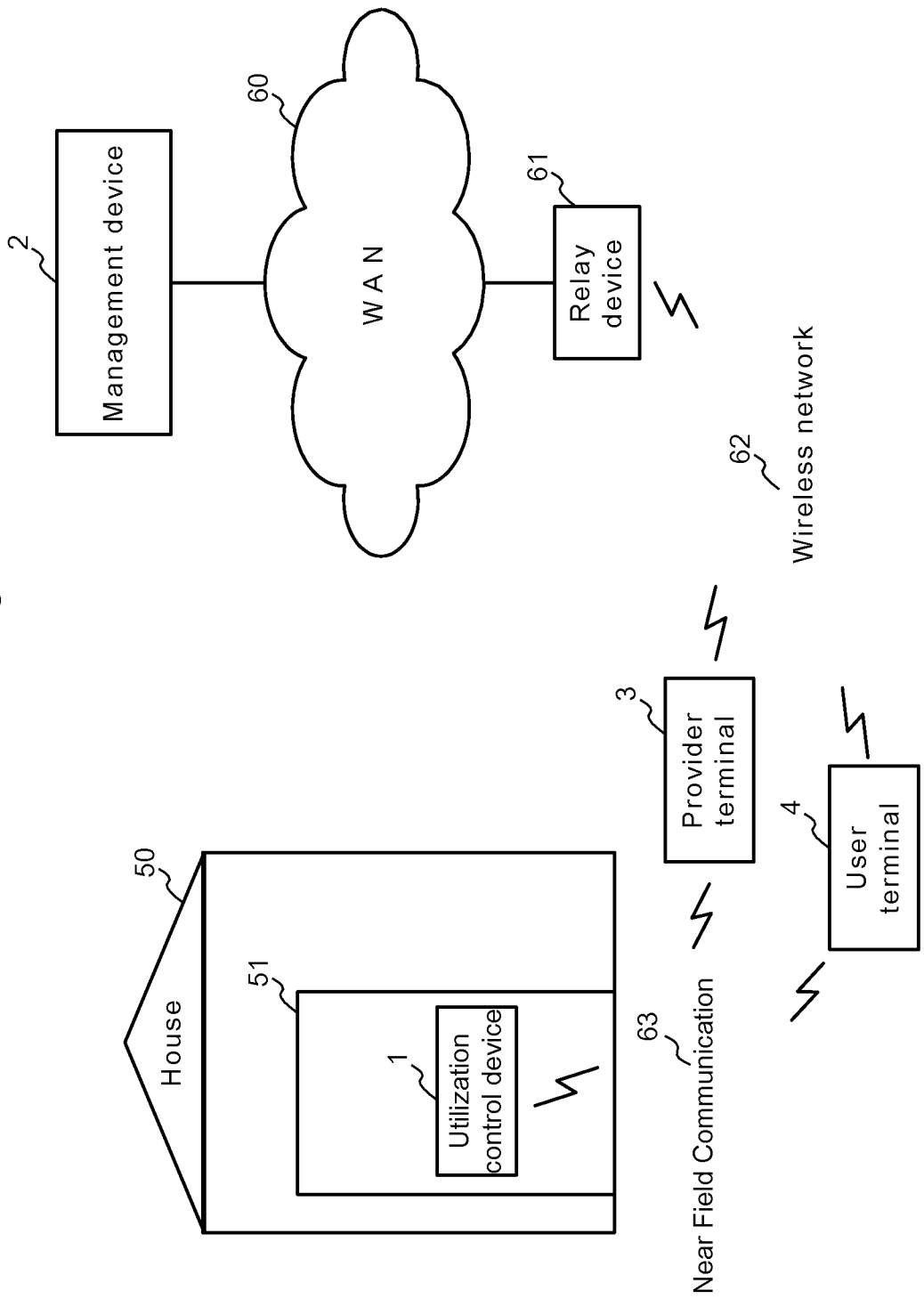
FIG. 1 is a schematic configuration diagram showing a utilization management system according to one embodiment of the present invention.

In the following, one embodiment of the present invention will be described referring to the drawings.

FIG. 1 is a schematic configuration diagram showing a utilization management system according to the present embodiment.

As shown in the figure, the utilization management system of the present embodiment comprises a utilization control device 1, a management device 2, a provider terminal 3, and a user terminal 4.

The utilization control device 1, which is provided for each usage target object, can communicate only by using Near Field Communication 63 such as Infrared Data Association (IrDA) or Bluetooth (registered trademark), and controls use of the usage target object, by locking/unlocking, access control, or encrypting/decrypting on the basis of a use permit. Here, it is assumed that the usage target object is a house 50 and use of the house 50 is controlled by locking and unlocking of an entrance 51. The management device 2 manages the utilization control device 1. Further, the management device 2 sends hole data, which is used for verification of a use permit, to the provider terminal 3 via a Wide Area Network (WAN) 60, and sends the use permit to the user terminal 4. The provider terminal 3, which is provided for each provider, is connected to the WAN 60 via a wireless network 62 and a relay device 61 such as a wireless base station or an access point, and receives the hole data from the management device 2. Further, the user terminal 4 sends the hole data received from the management device 2 to the utilization control device 1 via the Near Field Communication 63. The user terminal 4, which is provided for each user, is connected to the WAN 60 via the wireless network 62 and the relay device 61, and receives the use permit from the management device 2. Further, the provider terminal 3 sends the use permit received from the management device 2 to the utilization control device 1 via the Near Field Communication 63.

Figure 2:
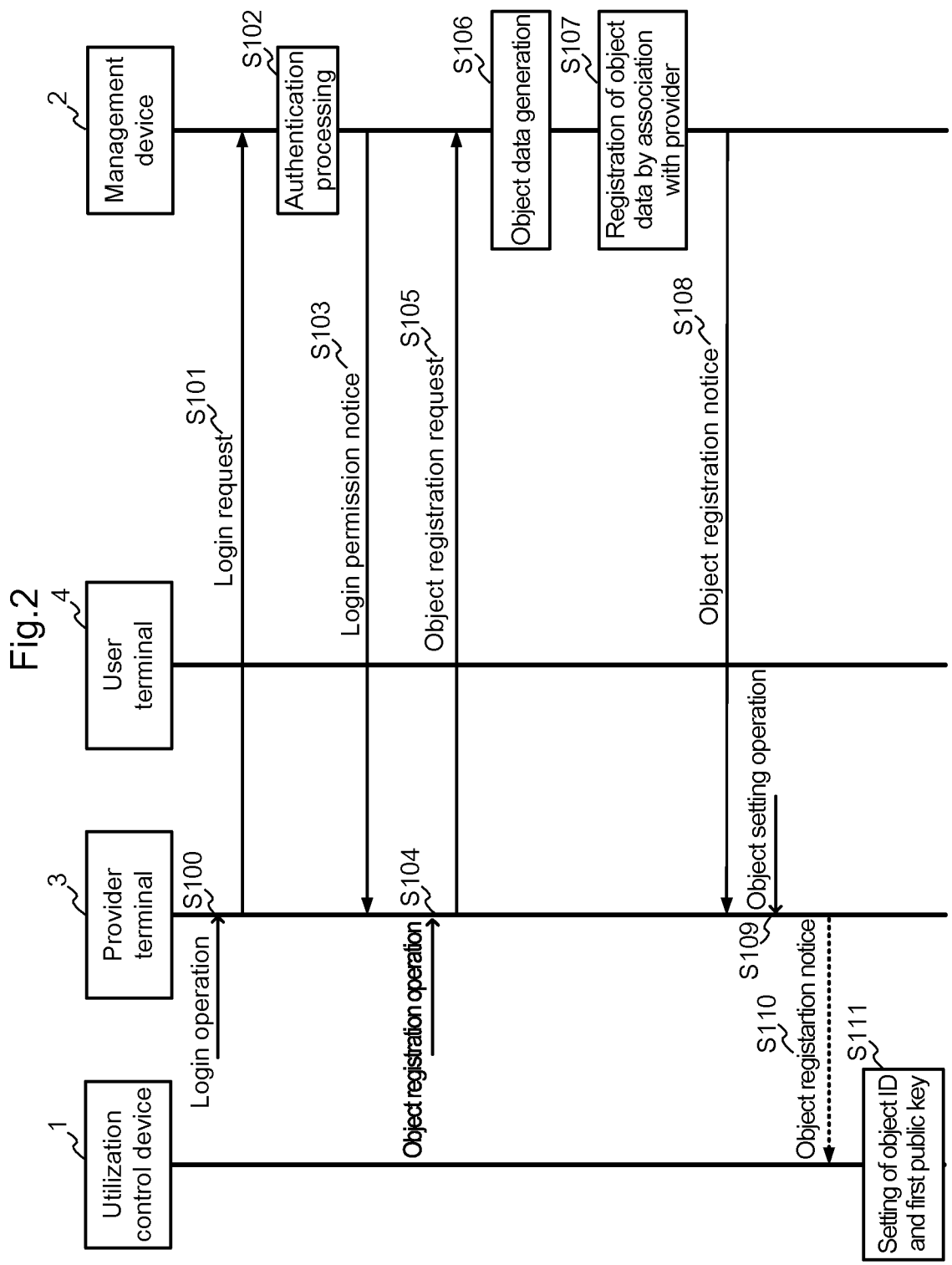
FIG. 2 is a sequence diagram showing an example of an object registration operation for registering a utilization control device 1 in a management device 2 in the utilization management system of the one embodiment of the present invention.

FIG. 2 is a sequence diagram showing an example of an object registration operation for registering the utilization control device 1 in the management device 2 in the utilization management system of the present embodiment.

First, when the provider terminal 3 receives a login operation from the provider who provides the services for using the usage target object (house 50) (S100), the provider terminal 3 sends a login request that includes provider's user ID and password to the management device 2 (S101). Receiving the login request, the management device 2 performs authentication processing by using the password included in the login request and a password that is managed by association with the user ID included in the login request (S102). When the authentication is established, the management device 2 permits the login of the provider terminal 3 i.e., the sender of the login request, and sends a login permission notice to the provider terminal 3 (S103).

Next, when the provider terminal 3 receives from the provider an object registration request operation accompanied by facility information that includes the facility name and the address of the house 50 as the usage target object (S104), the provider terminal 3 sends an object registration request including the facility information of the house 50 to the management device 2 (S105). Receiving the object registration request, the management device 2 issues an object ID to be given to the utilization control device 1, which is used for use control (control of locking/unlocking of the entrance 51) of the house 50. Further, the management device 2 generates a first secret key/public key according to the public key cryptosystem. Then, the management device 2 generates object data that includes the object ID, the first secret key/public key, and the facility information included in the object registration request (S106). Then, the management device 2 registers and manages the generated object data by associating the object data with the provider's user ID (S107). Thereafter, the management device 2 sends an object registration notice that includes the object ID and the first public key to the provider terminal 3 (S108).

Next, when the provider terminal 3 receives an object setting operation from the provider in a state that the provider terminal 3 is so close to the utilization control device 1 that it is possible to perform the Near Field Communication 63 (S109), the provider terminal 3 sends the object registration notice received from the management device 2 to the utilization control device 1 via the Near Field Communication 63 (S110). Receiving the notice, the utilization control device 1 sets in the utilization control device 1 itself the object ID and the first public key included in the object registration notice (S111).

Figure 3:
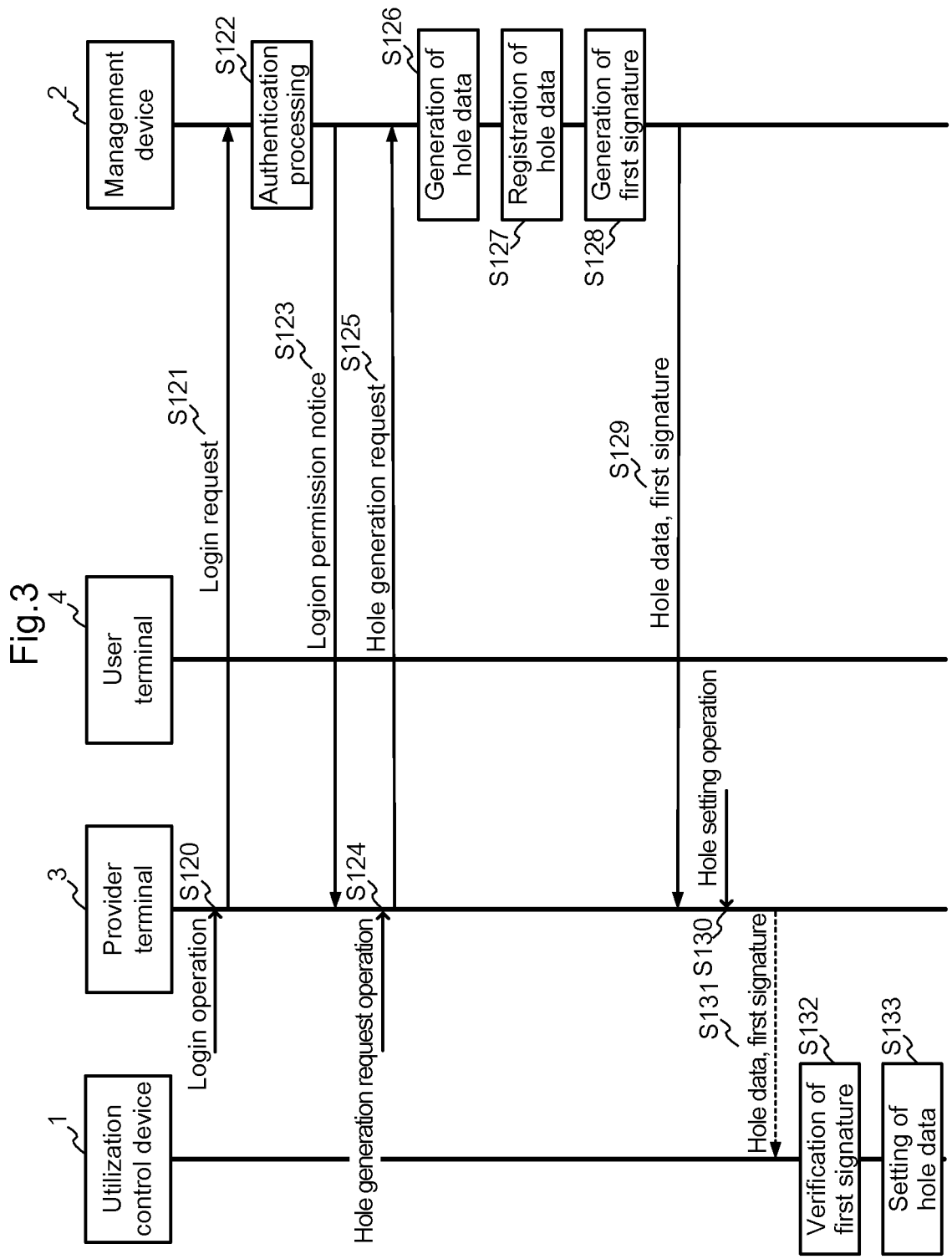
FIG. 3 is a sequence diagram showing an example of hole setting operation for setting hole data in the utilization control device 1 in the utilization management system of the one embodiment of the present invention.

FIG. 3 is a sequence diagram showing an example of hole setting operation for setting hole data in the utilization control device 1 in the utilization management system of the present embodiment.

First, when the provider terminal 3 receives a login operation from the provider who provides the service for using the usage target object (house 50) (S120), the provider terminal 3 sends a login request that includes the provider's user ID and password to the management device 2 (S121). Receiving the login request, the management device 2 performs authentication processing by using the password included in the login request and a password that is managed by association with the user ID included in the login request (S122). When the authentication is established, the management device 2 permits the login of the provider terminal 3 i.e. the sender of the login request, and sends a login permission notice to the provider terminal 3 (S123).

Next, when the provider terminal 3 receives from the provider a hole generation request operation accompanied by designation of the object ID of the utilization control device 1 (S124), the provider terminal 3 sends a hole generation request including the object ID to the management device 2 (S125). Receiving the hole generation request, the management device 2 generates a common key according to the common key cryptosystem, and generates a second secret key/public key according to the public key cryptosystem. Then, the management device 2 generates hole data that includes the object ID, the common key, and the second public key (S126). The management device 2 registers and manages the hole data together with the second secret key (S127). Further, the management device 2 specifies the object data that includes the object ID designated by the hole generation request operation among the object data under its management, and generates a first signature on the hole data by using the first secret key included in the object data (S128). Thereafter, the management device 2 sends the generated hole data and first signature to the provider terminal (S129).

Next, when the provider terminal 3 receives a hole setting operation from the provider in a state that the provider terminal 3 is so close to the utilization control device 1 that it is possible to perform the Near Field Communication (S130), the provider terminal 3 sends the hole data and first signature received from the management device 2 to the utilization control device 1 via the Near Field Communication 63 (S131). Receiving the hole data and the first signature, the utilization device 1 verifies the first signature received from the provider terminal 3 by using the hole data received from the provider terminal 3 and the first public key set in the utilization device 1 itself (S132). When the signature verification is established, the utilization device 1 sets the hole data in the utilization device 1 itself (S133).

Figure 4:
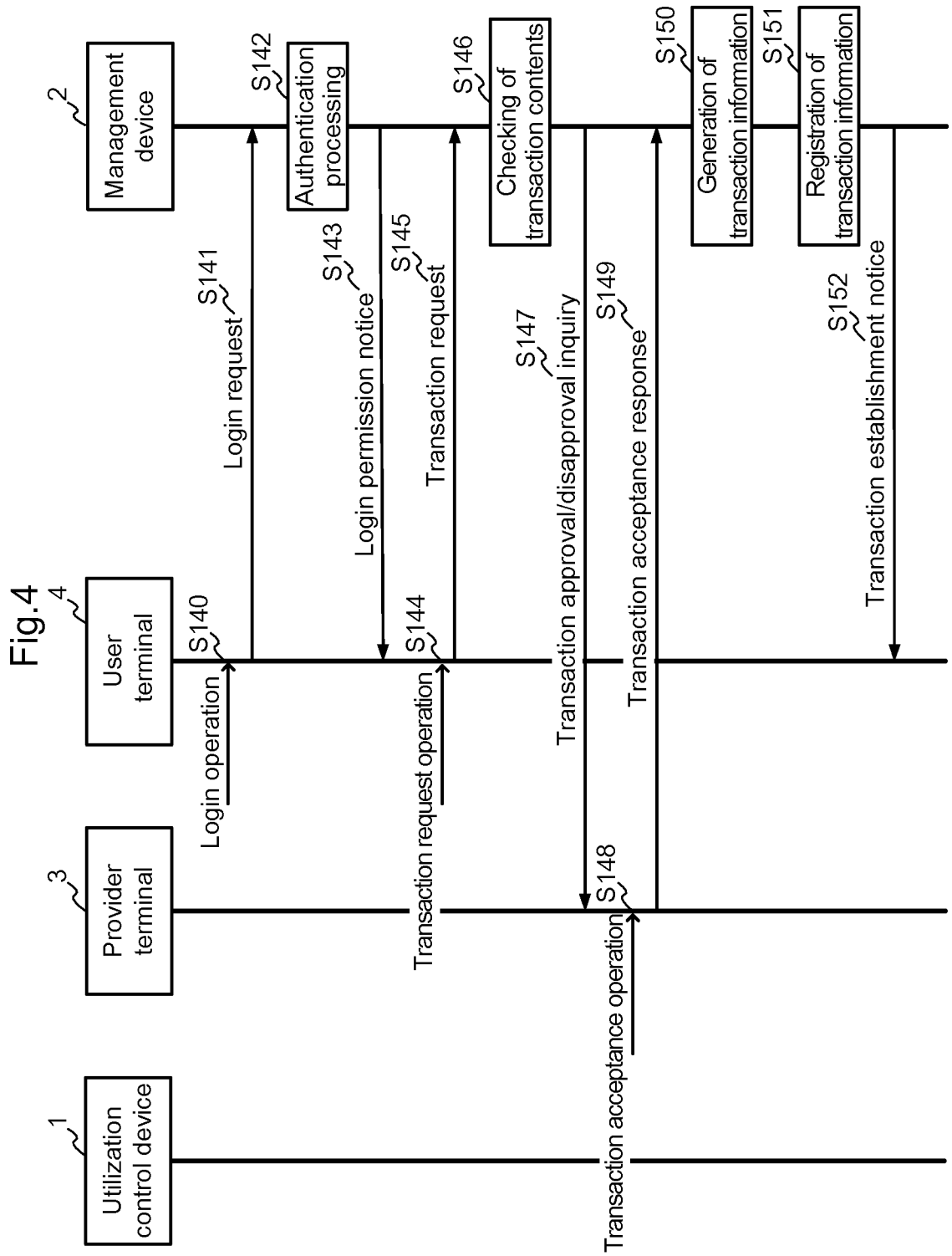
FIG. 4 is a sequence diagram showing an example of a transaction information registration operation for registering transaction information, which includes conditions for using a usage target object, in the management device 2 in the utilization management system of the one embodiment of the present invention.

FIG. 4 is a sequence diagram showing an example of a transaction information registration operation for registering transaction information, which includes conditions for using the usage target object (house 50), in the management device 2.

First, when the user terminal 4 receives a login operation from a user who receives the services for using the usage target object (house 50) (S140), the user terminal 4 sends a login request that includes user's user ID and password to the management device 2 (S141). Receiving the login request, the management device 2 performs authentication processing by using the password included in the login request and the password managed by association with the user ID included in the login request (S142). When the authentication is established, the management device 2 permits the login of the user terminal 4 i.e. the sender of the login request, and sends a login permission notice to the user terminal 4 (S143).

Next, when the user terminal 4 receives from the user a transaction request operation accompanied by designation of the user ID of the provider who provides the services for using the desired usage target object (house 50), the object ID of the utilization control device 1 installed in the usage target object, and desire information on use of the usage target object such as desired start and end times of use, the number of times of use, and the like (S144), the user terminal 4 sends to the management device 2 a transaction request that includes these designated provider's user ID, object ID, and desire information on use (S145).

Receiving the transaction request, the management device 2 checks the transaction contents on the basis of the information included in the transaction request (S146). In detail, the management device 2 confirms that there is the object data having the object ID included in the transaction request among the object data managed by association with the provider's user ID included in the transaction request, to determine that the services desired by the user can be provided. Then, the management device 2 generates a transaction approval/disapproval inquiry that includes the object ID and the desire information on use, which are included in the transaction request, and sends the transaction approval/disapproval inquiry to the provider terminal 3 that is identified by address information managed by association with the provider's use ID included in the transaction request (S147).

Next, when the provider terminal 3 receives the transaction approval/disapproval inquiry from the management device 2, the provider terminal 3 asks the provider about approval/disapproval of the transaction, by displaying the object ID and the desire information on use included in the transaction approval/disapproval inquiry. When the provider terminal 3 receives a transaction acceptance operation from the provider to the effect that the provider accepts the transaction (to provide the user with the services for using the usage target object whose use is under restriction by the utilization control device 1 identified by the object ID) (S148), the provider terminal 3 sends to the management device 2 a transaction acceptance response as a response to the transaction approval/disapproval inquiry (S149).

Receiving the transaction acceptance response, the management device 2 determines that the transaction has been established, and issues a transaction ID. Then, the management device 2 generates transaction information that includes the transaction ID, the user's user ID, the provider's user ID included in the transaction request, the object ID, the desire information on use, and a use permit obtainable time (for example, a time 24 hours before the desired start time of use) determined based on the desired start time of use included in the desire information on use (S150). Next, the management device 2 registers and manages the generated transaction information (S151). Then, the management device 2 sends a transaction establishment notice to the user terminal 4 (S152), to make the user terminal 4 display the transaction information.

Figure 5:
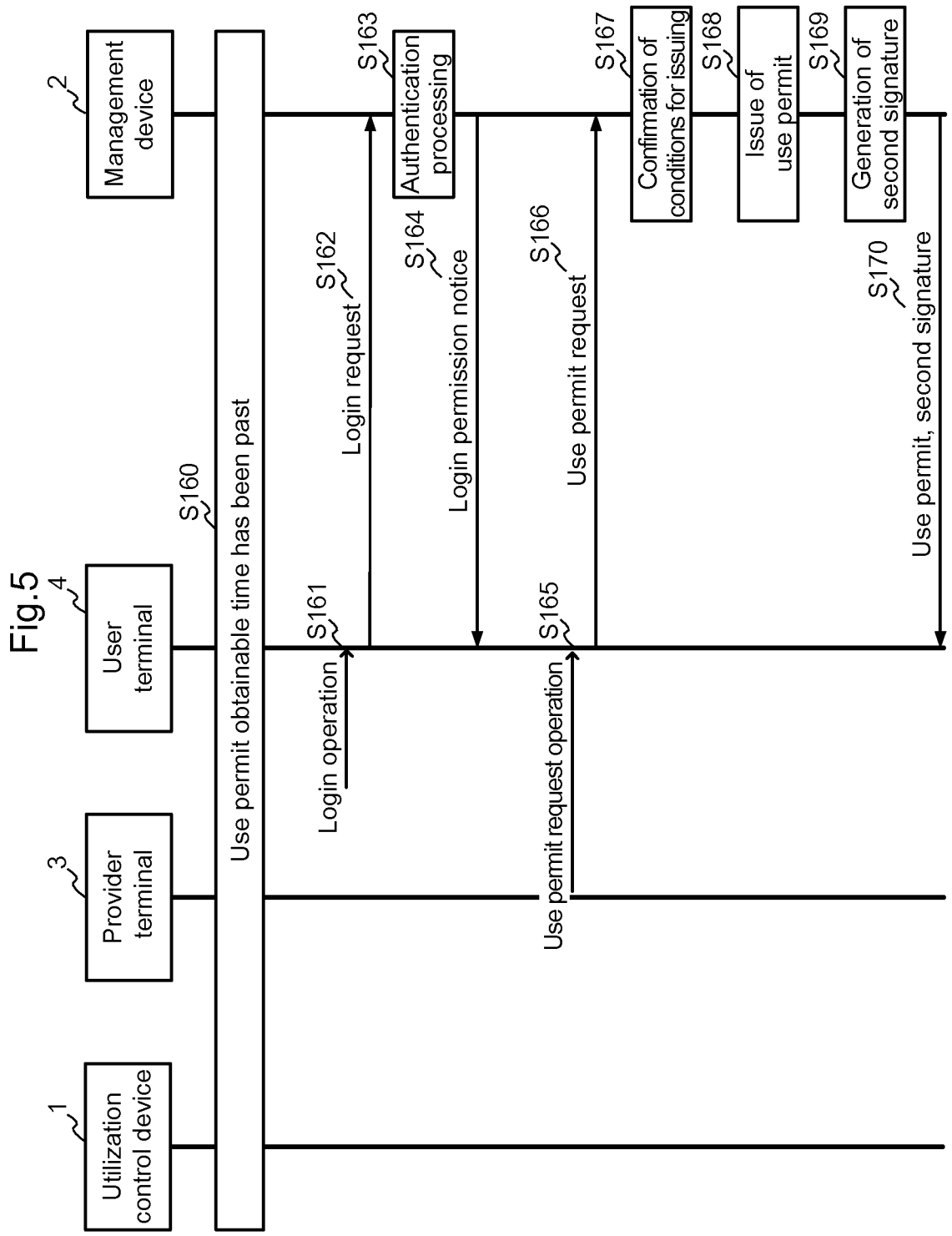
FIG. 5 is a sequence diagram showing an example of a use permit issue operation for the management device 2 to issue a use permit to a user terminal 4 in the utilization management system of the one embodiment of the present invention.

FIG. 5 is a sequential diagram showing an example of a use permit issue operation for the management device 2 to issue a use permit to the user terminal 4 in the utilization management system of the present embodiment.

It is assumed that it is after the use permit obtainable time of the transaction information included in the transaction establishment notice received by the user terminal 4 from the management device 2 (S160). When the user terminal 4 receives a login operation from the user who recognizes that it is after the use permit obtainable time (S161), the user terminal 4 sends to the management device 2 a login request that includes the user's user ID and password (S162). Receiving the login request, the management device 2 performs authentication processing by using the password included in the login request and a password that is managed by association with the user ID included in the login request (S163). When the authentication is established, the management device 2 permits the login of the user terminal 4, i.e., the sender of the login request, and sends a login permission notice to the user terminal 4 (S164).

Next, when the user terminal 4 receives from the user a use permit request operation accompanied by designation of the transaction ID included in the transaction information (S165), the user terminal 4 sends a use permit request that includes the transaction ID to the management device 2 (S166).

Receiving the use permit request, the management device 2 specifies the transaction information having the transaction ID included in the use permit request among the transaction information under its management, and confirms that the conditions for issuing a use permit are satisfied, based on the specified transaction information (S167). In detail, it is confirmed that the user ID of the user of the user terminal 4 coincides with the user's user ID included in the transaction information and the use permit obtainable time included in the transaction information has been past. Then, the management device 2 specifies hole data having the object ID included in the transaction information among the hole data under its management. Then, the management device 2 encrypts the transaction information by using the common key of the specified hole data, and issues a use permit that includes the encrypted transaction information (S168). Next, the management device 2 generates a second signature on the use permit by using the second secret key managed by association with the specified hole data (S169). Thereafter, the management device 2 sends the use permit and the second signature to the user terminal (S170).

Figure 6:
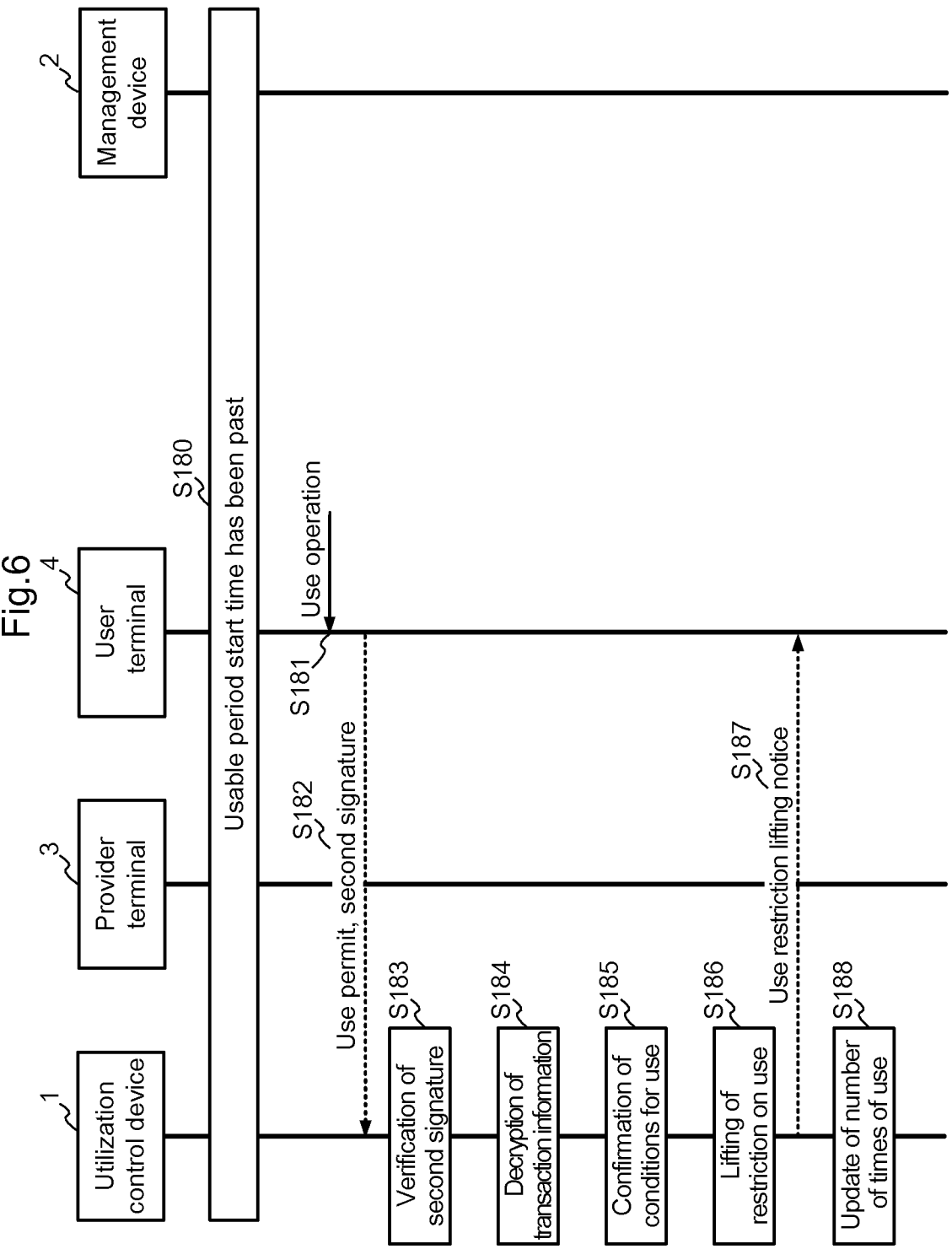
FIG. 6 is a sequence diagram showing an example of a use restriction lift operation for the utilization control device 1 to lift restriction on use of a usage target object in the utilization management system of the one embodiment of the present invention.

FIG. 6 is a sequence diagram showing an example of a use restriction lift operation for the utilization control device 1 to lift restriction on use of the usage target object in the utilization management system of the present embodiment.

It is assumed that it is after the usable period start time (start time of the period in which the object can be used) included in the desire information on use in the transaction information included in the transaction establishment notice that the user terminal has received from the management device 2 (S180). When the user terminal 4 receives a use operation from the user who recognizes that the present date is within the period specified by the usable period start and end times included in the desire information on use in the transaction information in a state that the user terminal 4 is close to the utilization control device 1 installed in the usage target object (house 50), which the user desires to receive the services of using, at a distance that allows the Near Field Communication 63 with the utilization control device 1 (S181), the user terminal 4 sends the use permit and the second signature received from the management device 2 via the Near Field Communication 63 to the utilization control device 1 (S182).

Receiving this, the utilization control device 1 verifies the second signature received from the user terminal 4 by using the use permit received from the user terminal 4 and the second public key included in the hole data set in the utilization control device 1 itself (S183). When the signature verification is established, the utilization control device 1 decrypts the encrypted transaction information included in the use permit by using the common key included in the hole data (S184).

Next, the utilization control device 1 confirms satisfaction of the conditions specified by the desire information on use included in the decrypted transaction information (S185). In detail, the utilization control device 1 confirms that the present date is within the period specified by the usable period start and end times included in the desire information on use. Further, the utilization control device 1 confirms that the number of times of use managed by association with the transaction ID of the transaction information is less than the number of times of use included in the desire information on use. Then, when it is confirmed that the conditions specified by the desire information on use are satisfied, the utilization control device 1 lifts the restriction on use of the usage target object (S186). Here, the utilization control device 1 unlocks the automatic lock of the entrance 51 of the house 50 as the usage target object.

Thereafter, the utilization control device 1 sends a use restriction lifting notice to the user terminal via the Near Field Communication 63 (S187). Then, the utilization control device 1 increments by one the number of times of use managed by association with the transaction ID of the transaction information (S188). Here, in the case where the number of times of use has not been managed by association with the transaction ID of the transaction information, the number of times of use "1" is managed by association with the transaction ID of the transaction information.

Next, details of the utilization control device and the management device 2 as components of the utilization management system of the present invention will be described. On the other hand, description of details of the provider terminal 3 and the user terminal 4 will be omitted since existing network terminals such as smartphones, tablet Personal Computers (PC), or the like having the Near Field Communication function can be used as those terminals.

First, details of the utilization control device 1 will be described.

Figure 7:
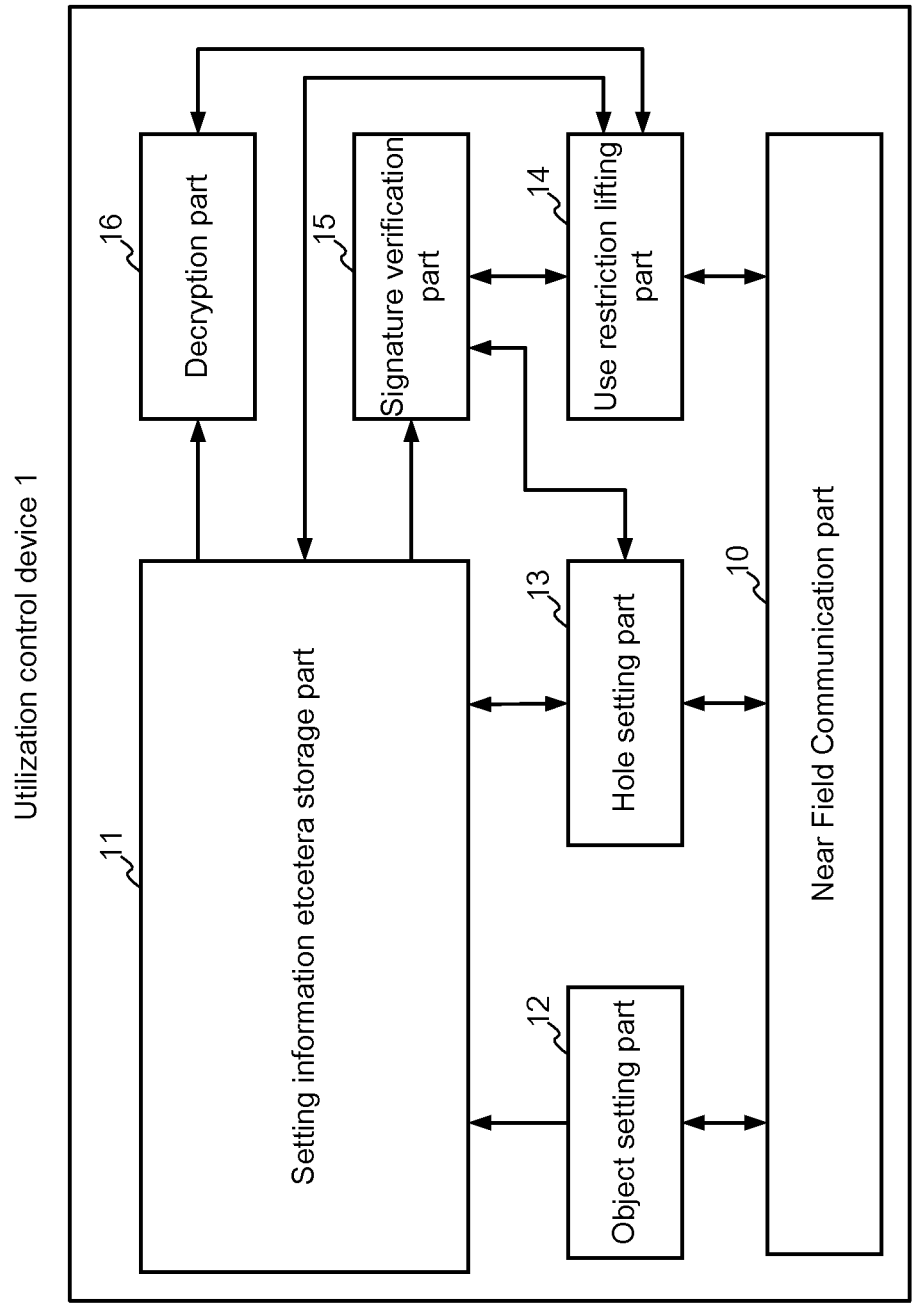
FIG. 7 is a schematic functional configuration diagram of the utilization control device 1.

FIG. 7 is a schematic functional configuration diagram of the utilization control device 1.

As shown in the figure, the utilization control device 1 comprises a Near Field Communication part 10, a setting information etcetera storage part 11, an object setting part 12, a hole setting part 13, a use restriction lifting part 14, a signature verification part 15, and a decryption part 16.

The Near Field Communication part 10 communicates with the provider terminal 3 and the user terminal 4 via the Near Field Communication 63 such as an IrDA device, Bluetooth (registered trademark), or the like.

The setting information etcetera storage part 11 stores setting information such as the object ID, the first public key, the hole data, and the like. Further, the setting information etcetera storage part 11 stores determination information that is used for determining whether the conditions, such as the number of times of use, for using the usage target object are satisfied.

The object setting part 12 stores, as the setting information, the object ID and the first public key obtained from the provider terminal 3 into the setting information etcetera storage part 11.

The hole setting part 13 stores the hole data as the setting information into the setting information etcetera storage part 11 when verification of the first signature obtained together with the hole data from the provider terminal 3 is established.

The use restriction lifting part 14 lifts the restriction on use of the usage target object, when verification of the second signature obtained together with the use permit from the user terminal 4 is established and the conditions specified by the desire information on use in the transaction information included in the use permit are satisfied. In the present embodiment, the use restriction lifting part 14 outputs an unlocking instruction to the automatic lock of the entrance 51 of the house 50. Further, the use restriction lifting part 14 registers/updates determination information, which includes for example the number of times of use, into/in the setting information etcetera storage part 11.

The signature verification part 15 verifies, according to an instruction of the hole setting part 13, the first signature on the hole data by using the first public key stored in the setting information etcetera storage part 11. Further, the signature verification part 15 verifies, according to an instruction of the use restriction lifting part 14, the second signature on the use permit by using the second public key included in the hole data stored in the setting information etcetera storage part 11.

The decryption part 16 decrypts, according to an instruction of the use restriction lifting part 14, the encrypted transaction information included in the use permit by using the common key included in the hole data stored in the setting information etcetera storage part 11.

Here, the schematic functional configuration of the utilization control device 1 shown in FIG. 7 may be implemented by hardware, for example by using an integrated logic IC such as an Application Specific Integrated Circuit (ASIC), a Field Programmable Gate Array (FPGA), or the like, or may be implemented by software on a computer device such as a Digital Signal Processor (DSP), or the like. Or, in a general-purpose computer comprising a CPU, a memory, an auxiliary storage such as a flash memory or a hard disk drive, and a Near Field Communication device such as an IrDA communication device or a Bluetooth (registered trademark) communication device, the schematic functional configuration may be implemented by the CPU loading a prescribed program into the memory from the auxiliary storage and executes the program.

Figure 8:
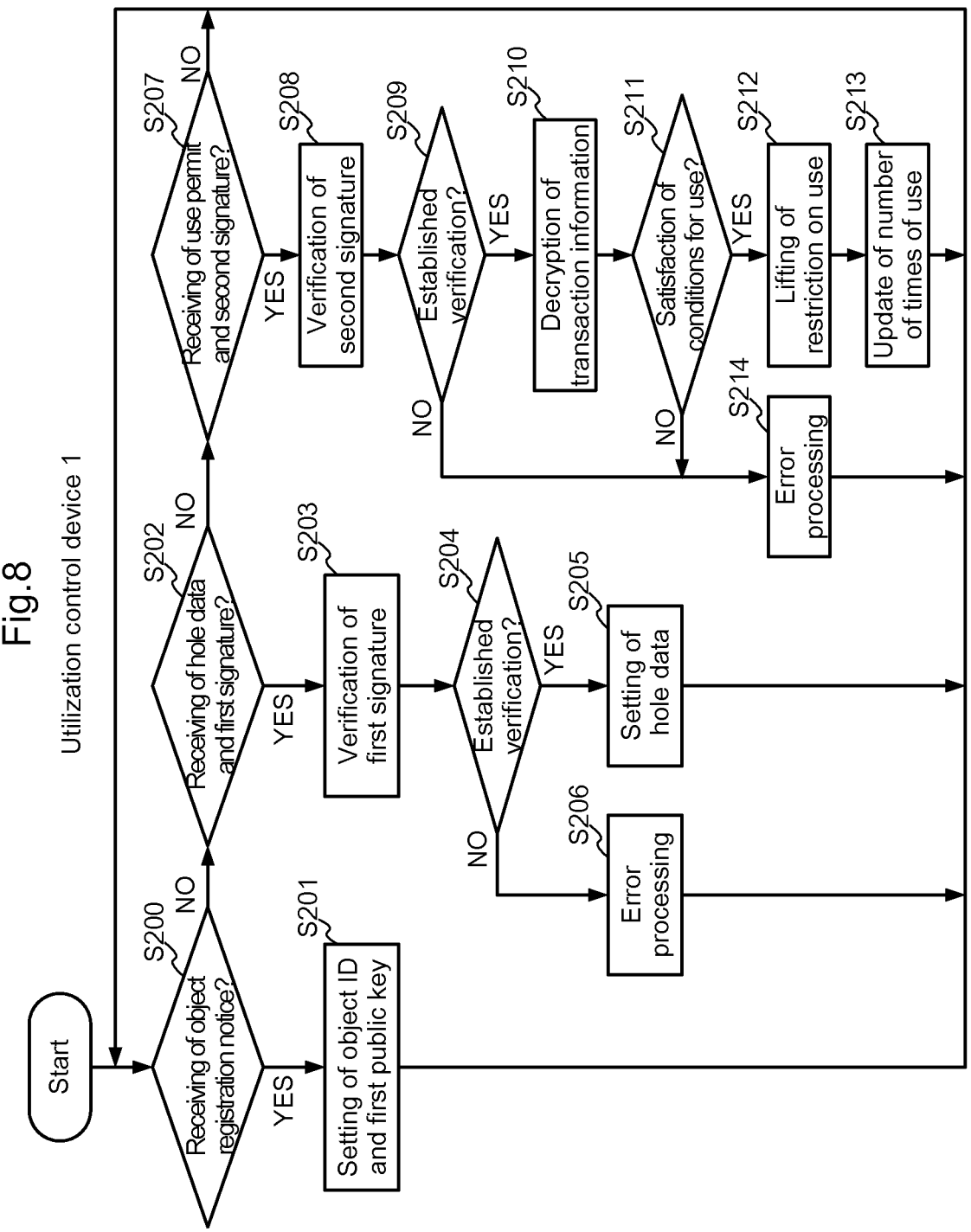
FIG. 8 is a flowchart for explaining operation of the utilization control device 1.

FIG. 8 is a flowchart for explaining operation of the utilization control device 1.

When the object setting part 12 receives an object registration notice from the provider terminal 3 via the Near Field Communication part 10 (YES in S200), the object setting part 12 stores, as the setting information, the object ID and the first public key included in the object registration notice into the setting information etcetera storage part 11 (S201).

Further, when the hole setting part 13 receives the hole data and the first signature from the provider terminal 3 via the Near Field Communication part 10 (YES in S202), the hole setting part 13 delivers the hole data and the first signature to the signature verification part 15 and requests the signature verification part 15 to verify the first signature. Receiving the request, the signature verification part 15 verifies the first signature on the hole data by using the first public key stored in the setting information etcetera storage part 11 (S203). In detail, the signature verification part 15 verifies the validity of the first signature by using the first public key to decrypt the first signature and by determining whether the decrypted information coincides with the hole data or the message digest (hash value) of the hole data.

Next, the signature verification part 15 notifies the hole setting part 13 of the verification result of the first signature. Receiving this, when the verification of the first signature is established to validate the first signature (YES in S204), the hole setting part 13 stores the hole data as the setting information into the setting information etcetera storage part 11 (S205). On the other hand, when the verification of the first signature fails and the first signature cannot be validated (NO in S204), the hole setting part 13 performs predetermined error processing such as sending of an error message to the provider terminal 3 via the Near Field Communication part 10 (S206).

Further, when the use restriction lifting part 14 receives the use permit and the second signature from the user terminal 4 via the Near Field Communication Part 10 (YES in S207), the use restriction lifting part 14 delivers the use permit and the second signature to the signature verification part 15 and instructs the signature verification part 15 to verify the second signature. Receiving the instruction, the signature verification part 15 verifies the second signature on the use permit by using the second public key included in the hole data that is stored in the setting information etcetera storage part 11 (S208). In detail, the signature verification part 15 verifies the validity of the second signature by using the second public key to decrypt the second signature and by determining whether the decrypted information coincides with the use permit or the message digest of the use permit.

Next, the signature verification part 15 notifies the use restriction lifting part 14 of the verification result of the second signature. Receiving this, when the verification of the second signature is established to validate the second signature (YES in S209), the use restriction lifting part 14 delivers the encrypted transaction information included in the use permit to the decryption part 16 and instructs the decryption part 16 to decrypt the encrypted transaction information. On the other hand, when the verification of the second signature fails and the second signature cannot be validated (NO in S209), the use restriction lifting part 14 performs predetermined error processing such as sending of an error message to the user terminal 4 via the Near Field Communication part 10 (S214).

Next, when the decryption part 16 receives the instruction of decrypting together with the encrypted transaction information from the use restriction lifting part 14, the decryption part 16 decrypts the encrypted transaction information by using the common key included in the hole data that is stored in the setting information etcetera storage part 11 (S210). Then, the decryption part 16 delivers the decrypted transaction information to the use restriction lifting part 14.

Receiving the decrypted transaction information, the use restriction lifting part 14 determines satisfaction of the conditions specified by the desire information on use included in the decrypted transaction information (S211). In detail, the use restriction lifting part 14 determines whether the present date is within the period specified by the usable period start and end times included in the desire information on use. Further, the use restriction lifting part 14 determines whether the number of times of use stored in the setting information etcetera storage part 11 being associated with the transaction ID of the transaction information is less than the number of times of use included in the desire information on use. Here, in the case where there is not the number of times of use stored in the setting information etcetera storage part 11 being associated with the transaction ID of the transaction information, the number of times of use is determined to be "0".

Next, when the use restriction lifting part 14 determines that the conditions specified by the desire information on use included in the transaction information are satisfied (YES in S211), the use restriction lifting part 14 lifts the restriction the restriction on use of the usage target object (S212). In the present embodiment, the use restriction lifting part 14 outputs an unlocking instruction to the automatic lock of the entrance 51 of the house 50. Further, the use restriction lifting part 14 updates the number of times of use stored in the setting information etcetera storage part 11 being associated with the transaction ID of the transaction information (S213). Here, in the case where the number of times of use is not registered in the setting information etcetera storage part 11 being associated with the transaction ID of the transaction information, the use restriction lifting part 14 registers "1" as the number of times of use in the setting information etcetera storage part 11 being associated with the transaction ID of the transaction information.

On the other hand, when the use restriction lifting part 14 determines that the conditions specified by the desire information on use included in the transaction information are not satisfied (NO in S211), the use restriction lifting part 14 performs predetermined error processing such as sending of an error message to the user terminal 4 via the Near Field Communication part 10 (S214).

Next, details of the management device 2 will be described.

Figure 9:
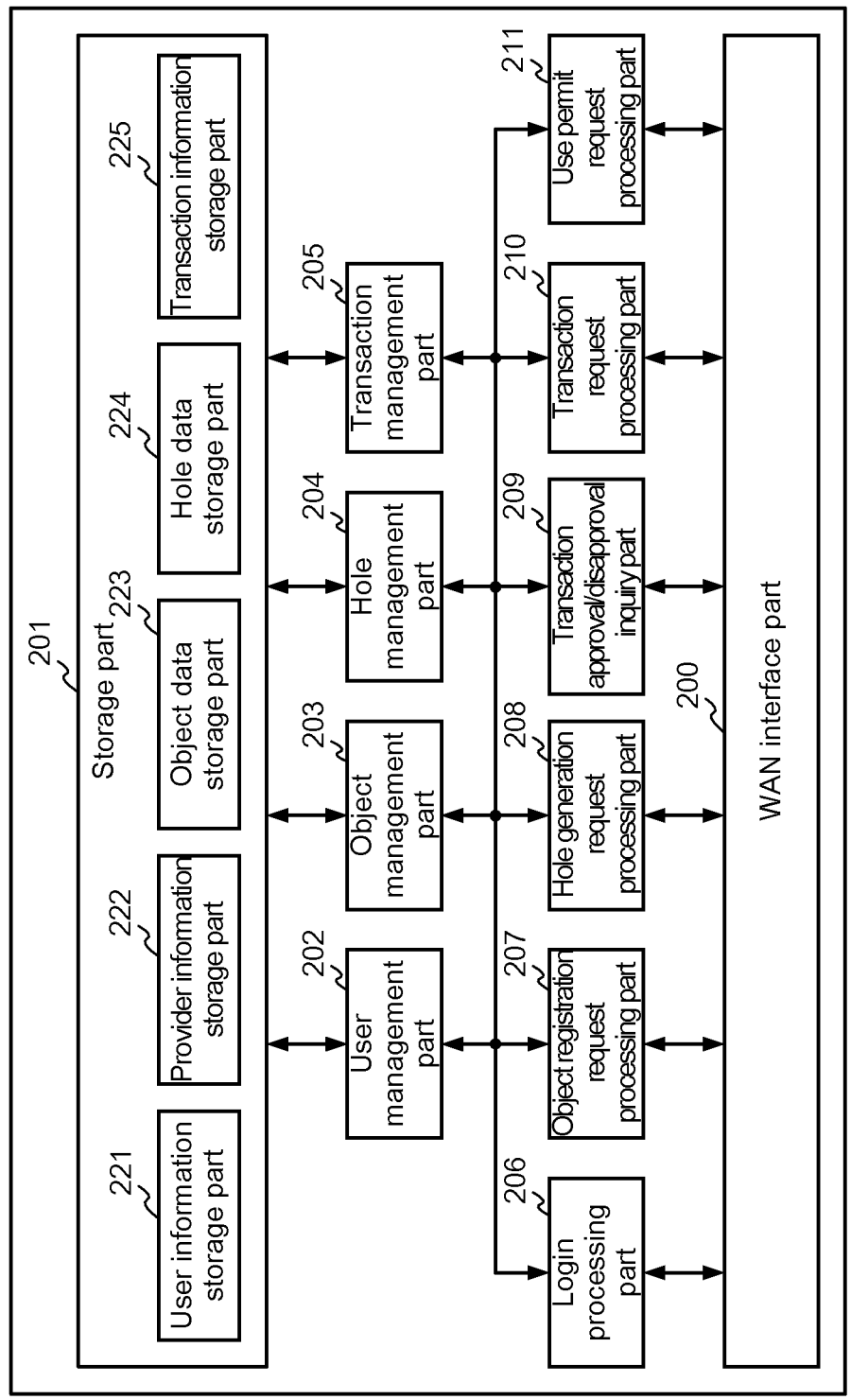
FIG. 9 is a schematic functional configuration diagram of the management device 2.

FIG. 9 is a schematic functional configuration diagram of the management device 2.

As shown in the figure, the management device 2 comprises a WAN interface part 200, a storage part 201, a user management part 202, an object management part 203, a hole management part 204, a transaction management part 205, a login processing part 206, an object registration request processing part 207, a hole generation request processing part 208, a transaction approval/disapproval inquiry part 209, a transaction request processing part 210, and a use permit request processing part 211.

The WAN interface part 200 is an interface for connecting with the WAN 60.

The storage part 201 comprises a user information storage part 221, a provider information storage part 222, an object data storage part 223, a hole data storage part 224, and a transaction information storage part 225.

The user information storage part 221 stores user information of each user.

FIG. 10 is a diagram showing schematically an example of contents registered in the user information storage part 221.

As shown in the figure, the user information storage part 221 stores a record 2210 of user information for each user. The record 2210 of user information comprises: a field 2211 for registering a user ID of a user; a field 2212 for registering a password of the user; a field 2213 for registering address information of the user terminal 4 on the WAN 60; and a field 2214 for registering personal information of the user such as a name, an address, contact information, and the like.

The provider information storage part 222 stores provider information for each provider.

FIG. 11 is a diagram showing schematically an example of contents registered in in the provider information storage part 222.

As shown in the figure, the provider information storage part 222 stores a record 2220 of provider information for each provider. The record 2220 of provider information comprises: a field 2221 for registering a user ID of a provider; a field 2222 for registering a password of the provider; a field 2223 for registering address information of the provider terminal 3 on the WAN 60; and a field 2224 for registering personal information of the provider such as a name, an address, contact information, and the like.

The object data storage part 223 stores object data for each utilization control device 1.

FIG. 12 is a diagram showing schematically an example of contents registered in the object data storage part 223.

As shown in the figure, the object data storage part 223 stores a record 2230 of object data for each utilization control device 1. The record 2230 of object data comprises: a field 2231 for registering object ID as an identifier; a field 2232 for registering a first public key; a field 2233 for registering a first secret key; a field 2234 for registering facility information that includes a facility name, an address, and the like of a house 50 as a usage target object; and a field 2235 for registering a user ID of a provider who provides services for using the usage target object.

The hole data storage part 224 stores information that includes hole data for each utilization control device 1.

FIG. 13 is a diagram showing schematically an example of contents registered in the hole data storage part 224.

As shown in the figure, the hole data storage part 224 stores a record 2240 of hole data for each utilization control device 1. The record 2240 of hole data comprises: a field 2241 for registering a hole ID as an identifier; a field 2242 for registering a second public key; a field 2243 for registering a second secret key; a field 2244 for registering a common key; and a field 2245 for registering an object ID given to a utilization control device 1 in which the hole data is set. Here, the second public key, the common key, and the object ID registered respectively in the fields 2242, 2244, and 2245 make up the hole data set in the utilization control device 1.

The transaction information storage part 225 stores transaction information for each transaction established between a provider and a user with respect to services for using a usage target object.

FIG. 14 is a diagram showing schematically an example of contents registered in the transaction information storage part 225.

As shown in the figure, the transaction information storage part 225 stores a record 2250 of transaction information for each transaction of services for using. The record 2250 of transaction information comprises: a field 2256 for registering a transaction ID as an identifier; a field 2251 for registering an object ID given to a utilization control device 1 installed in a usage target object that becomes an object of transaction of services for using the usage target object; a field 2252 for registering a user ID of a user; a field 2253 for registering a user ID of a provider; a field 2254 for registering user's desire information on use including usable period start and end times and the number of times of use; and a field 2255 for registering a use permit obtainable time when it becomes possible to obtain a use permit.

The user management part 202 manages the user information by using the user information storage part 221 and manages the provider information by using the provider information storage part 222.

The object management part 203 manages the object data by using the object data storage part 223.

The hole management part 204 manages the hole data by using the hole data storage part 224.

The transaction management part 205 manages the transaction information by using the transaction information storage part 225.

The login processing part 206 processes a login request received from the provider terminal 3 or the user terminal 4, in cooperation with the user management part 202.

The object registration request processing part 207 processes an object registration request received from the provider terminal 3, in cooperation with the object management part 203.

The hole generation request processing part 208 processes a hole generation request received from the provider terminal 3, in cooperation with the object management part 203 and the hole management part 204.

The transaction approval/disapproval inquiry part 209 inquires of the provider terminal 3 as to transaction approval/disapproval concerning services for using a usage target object, according to instructions of the transaction request processing part 210.

The transaction request processing part 210 processes a transaction request received from the user terminal 4, in cooperation with the transaction management part 204 and the transaction approval/disapproval inquiry part 209.

The use permit request processing part 211 processes a use permit request received from the user terminal 4, in cooperation with the hole management part 204 and the transaction management part 205.

Here, the schematic functional configuration of the management device 2 shown in FIG. 9 may be implemented by hardware, for example by using an integrated logic ID such as an ASIC, a FPGA, or the like, or by software on a computer device such as a DSP, or the like. Or, in a general-purpose computer comprising a CPU, a memory, an auxiliary storage such as a flash memory or a hard disk drive, and a communication device such as a Network Interface Card (NIC) or the like, the schematic functional configuration may be implemented by the CPU loading a prescribed program into the memory from the auxiliary storage and executes the program. Or, the schematic functional configuration may be implemented by a distributed system in which a plurality of general-purpose computers cooperate one another.

Figure 15:
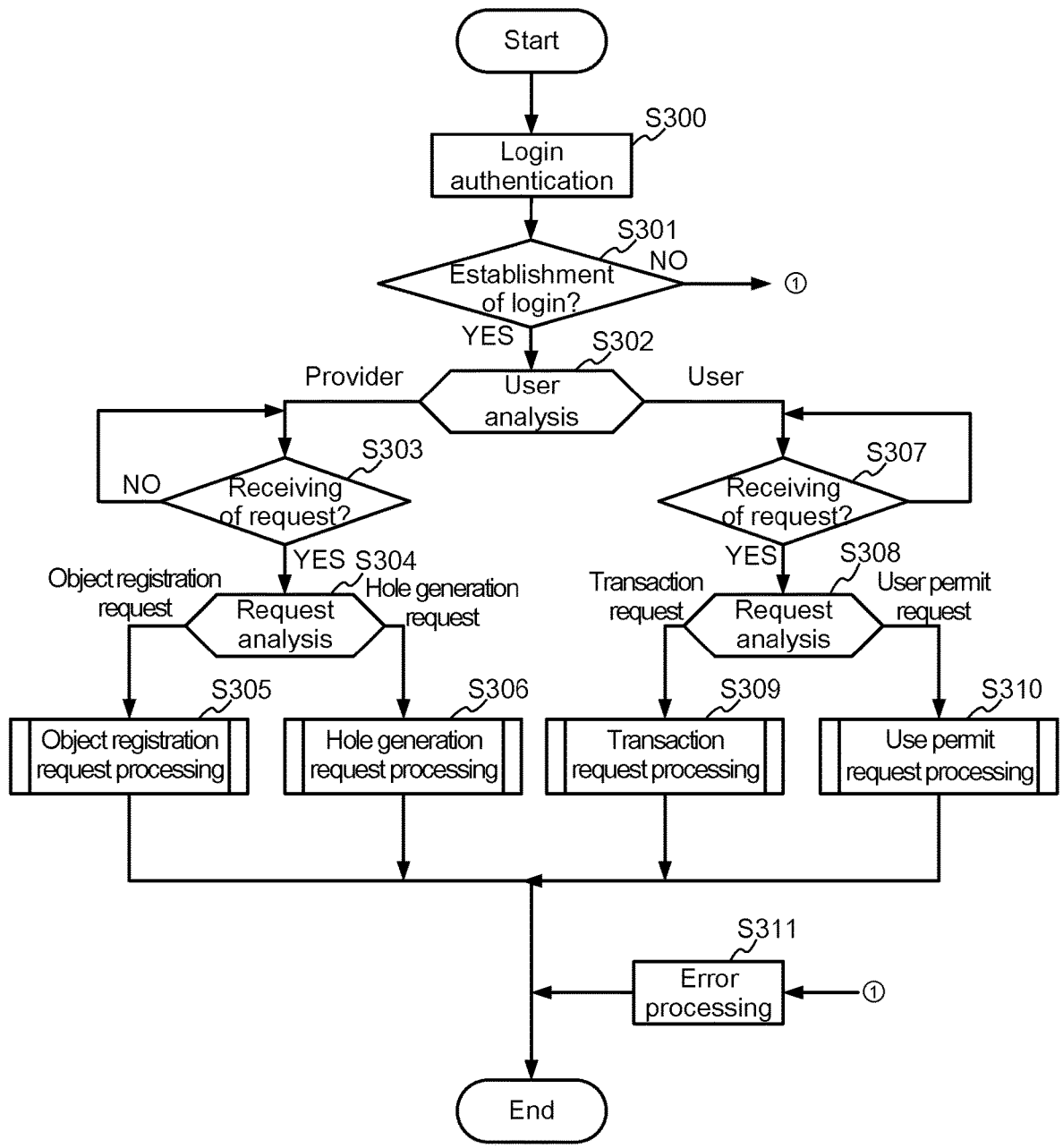
FIG. 15 is a flowchart for explaining operation of the management device 2.

FIG. 15 is a flowchart for explaining operation of the management device 2.

The flow is started when the WAN interface part 200 receives a login request from the provider terminal 3 or the user terminal 4 via the WAN 60.

First, the WAN interface part 200 notifies the login processing part 206 of the login request received. Receiving this, the login processing part 206 performs login processing (S300).

In detail, in the case where the login request is received from the provider terminal 3, the login processing part 206 notifies the user management part 202 of a password search that is accompanied by designation of the provider's ID included in the login request. Receiving this, the user management part 202 searches the provider information storage part 222 for a satisfactory record 2220 by using as the key the provider's user ID designated by the login processing part 206. When the record 2220 can be detected, the user management part 202 notifies the login processing part 206 of the password registered in the record 2220. When the record 2220 cannot be detected, the user management part 202 notifies the login processing part 206 to the effect that the searched record does not exist. On the other hand, in the case where the login request is received from the user terminal 4, the login processing part 206 notifies the user management part 202 of a password search that accompanied by designation of the user's user ID included in the login request. Receiving this, the user management part 202 searches the user information storage part 221 for a satisfactory record 2210 by using as the key the user's user ID designated by the login processing part 206. When the record 2210 can be detected, the user management part 202 notifies the login processing part 206 of the password registered in the record 2210. When the record 2210 cannot be detected, the user management part 202 notifies the login processing part 206 to the effect that the searched record does not exist. When the password received from the user management part 202 coincides with the password included in the received login request, the login processing part 206 permits the login (authentication is established). When the password received from the user management part 202 does not coincide with the password included in the received login request or when the notice is received from the user management part 202 to the effect that the searched record does not exist, the login processing part 206 rejects the login (authentication is not established).

Next, in the case where the login authentication is not established (NO in S301), the login processing part 206 performs predetermined error processing such as sending of an error message to the sender of the login request via the WAN interface part 200 (S311). On the other hand, in the case where the login authentication is established (YES in S301), the login processing part 206 sends a login permission notice to the sender of the login request via the WAN interface part 200, and manages the state of login of the sender of the login request. At the same time, in the case where the sender of the login request is the provider terminal 3 ("Provider" in S302), the processing proceeds to S303. In the case where the sender is the user terminal 4 ("User" in S302), the processing proceeds to S307.

In S303, the WAN interface part 200 waits for receiving a request from the provider terminal 3 whose login has been permitted. Then, when a request received from the provider terminal 3 is an object registration request ("Object registration request" in S304), the WAN interface part 200 notifies the object registration request processing part 207 of the object registration request together with the provider's user ID included in the login request received from the provider terminal 3, so that the below-described object registration request processing is performed (S305). When a request received from the provider terminal 3 is a hole generation request ("Hole generation request" in S304), the WAN interface part 200 notifies the hole generation request processing part 208 of the hole generation request together with the provider's user ID included in the login request received from the provider terminal 3, so that the below-described hole generation request processing is performed (S306).

Further, in S307, the WAN interface part 200 waits for receiving a request from the user terminal 4 whose login has been permitted. Then, when a request received from the user terminal 4 is a transaction request ("Transaction request" in S308), the WAN interface part 200 notifies the transaction request processing part 210 of the transaction request together with the user's user ID included in the login request received from the user terminal 4, so that the below-described transaction request processing is performed (S309). When a request received from the user terminal 4 is a use permit request ("Use permit request" in S308), the WAN interface part 200 notifies the use permit request processing part 211 of the use permit request together with the user's user ID included in the login request received from the user terminal 4, so that the below-described use permit request processing is performed (S310).

Figure 16:
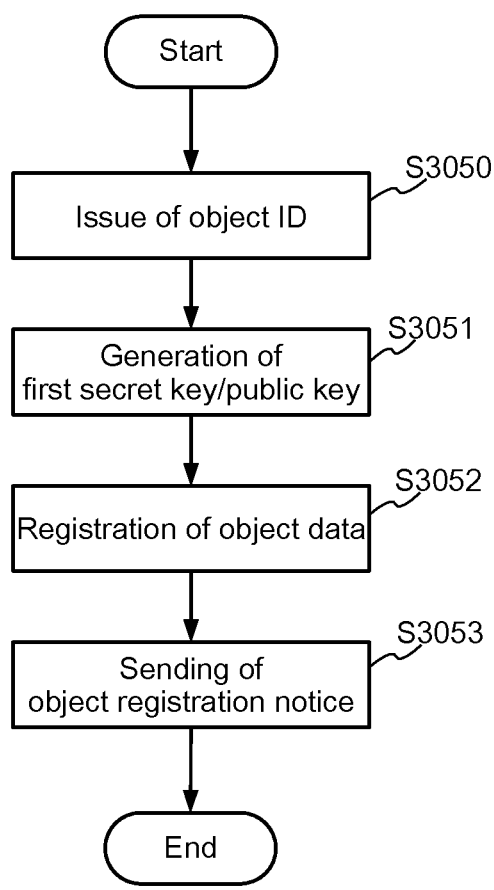
FIG. 16 is a flowchart for explaining the object registration request processing S305 shown in FIG. 15.

FIG. 16 is a flowchart for explaining the object registration request processing S305 shown in FIG. 15.

First, the object registration request processing part 207 issues an object ID (S3050), and at the same time generates a first secret key/public key according to the public key cryptosystem (S3051). Then, the object registration request processing part 207 generates object data that includes the object ID, the first secret key/public key, and the facility information included in the object registration request, and notifies the object management part 203 of the object data together with the provider's user ID to instruct the object management part 203 to manage the object data.

Receiving this, the object management part 203 adds a record 2230 of object data to the object data storage part 223, and registers the object data (the object ID, the first public key, the first secret key, and the facility information) in the record 2230, associating the object data with the provider's user ID (S3052). Then, the object management part 203 notifies the object registration request processing part 207 of the object ID and the first public key.

Next, the object registration request processing part 207 generates an object registration notice that includes the object ID and the first public key notified from the object management part 203, and sends the object registration notice to the provider terminal 3 as the sender of the object registration request (S3053).

Figure 17:
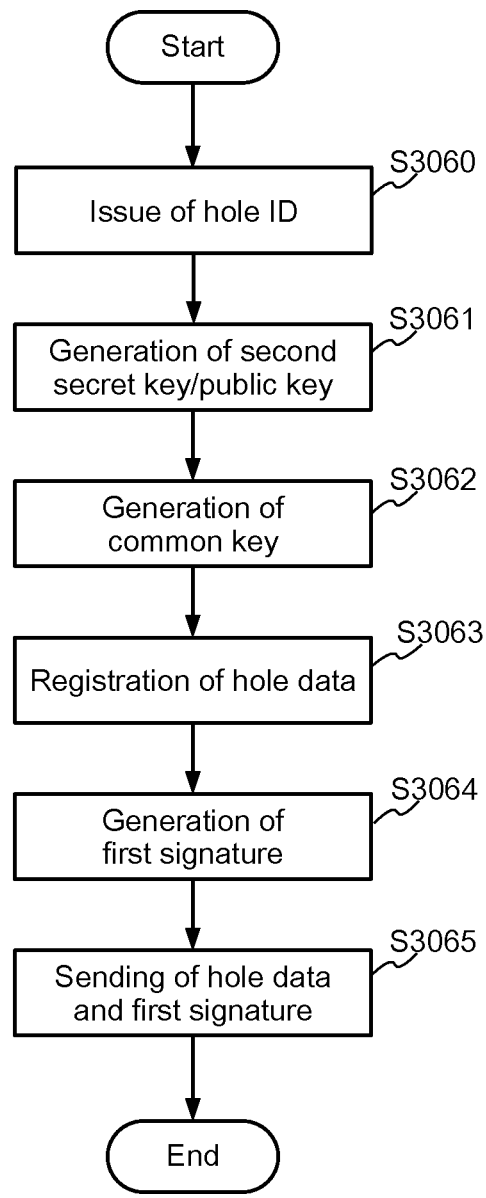
FIG. 17 is a flowchart for explaining the hole generation request processing S306 shown in FIG. 15.

FIG. 17 is a flowchart for explaining the hole generation request processing S306 shown in FIG. 15.

First, the hole generation request processing part 208 issues a hole ID (S3060). Further, the hole generation request processing part 208 generates a second secret key/public key according to the public key cryptosystem (S3061), and generates a common key according to the common key cryptosystem (S3062).

Next, the hole management part 208 generates hole data that includes the object ID, which is included in the hole generation request, the first public key, and the common key. Then, the hole management part 208 notifies the hole management part 204 of the hole data together with the hole ID and the second secret key to instruct the hole management par 204 to manage the hole data. Receiving this, the hole management part 204 adds a record 2240 of hole data in the hole data storage part 224, and registers in the record 2240 the hole data (the object ID, the second public key, the common key) together with the hole ID and the second secret key (S3063).

Next, the hole generation request processing part 208 notifies the object management part 203 of the object ID included in the hole generation request to instruct the object management part 203 to search for the first secret key. Receiving this, the object management part 203 searches the object data storage part 223 for the record 2230 of the object data by using the object ID as the key, and notifies the hole generation request processing part 208 of the first secret key included in the detected record 2230. Then, the hole generation request processing part 208 generates a first signature on the hole data by using the first secret key notified from the object management part 203 (S3064).

Then, the hole generation request processing part 208 sends the hole data together with the first signature to the provider terminal 3 as the sender of the hole generation request (S3065).

Figure 18:
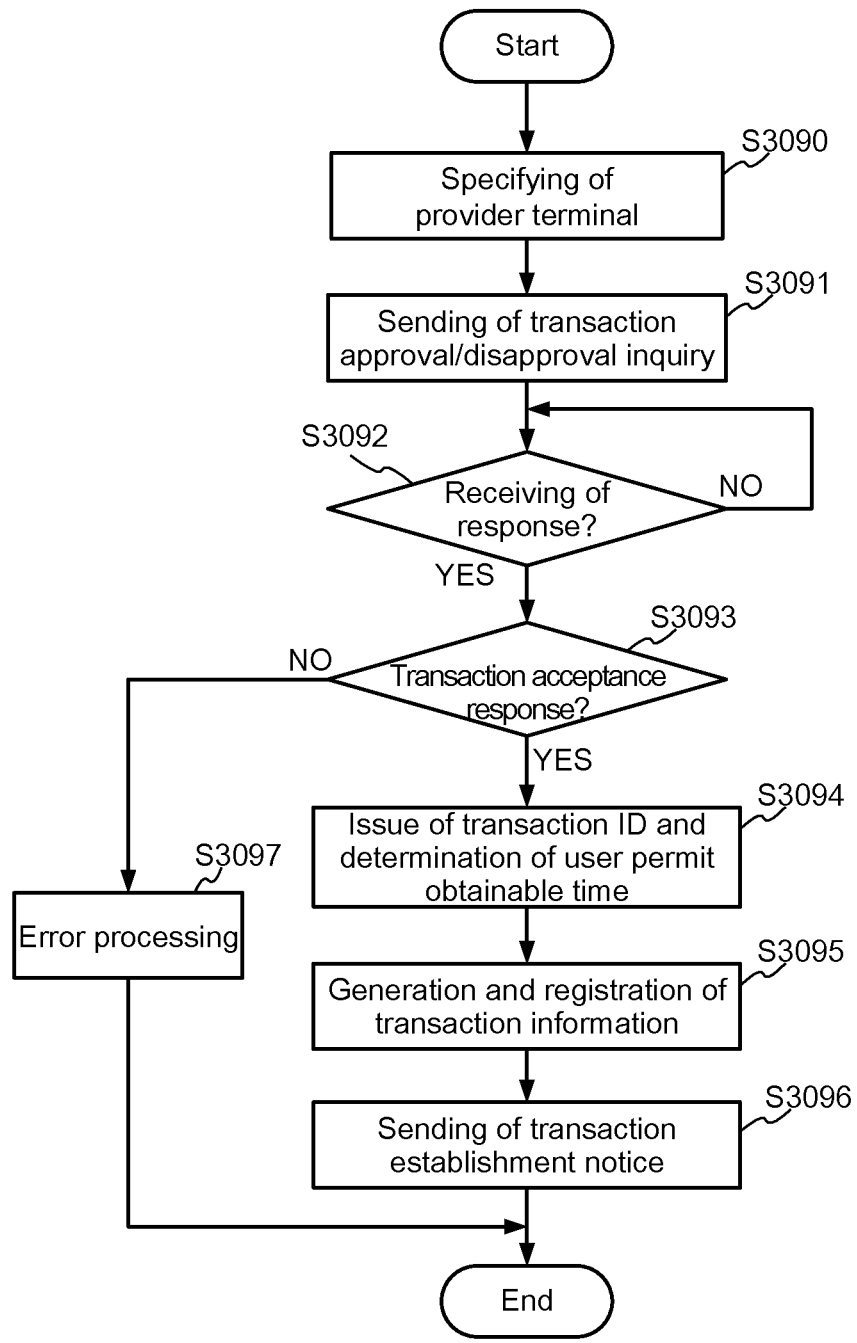
FIG. 18 is a flowchart for explaining the transaction request processing S309 shown in FIG. 15.

FIG. 18 is a flowchart for explaining the transaction request processing S309 shown in FIG. 15.

First, the transaction request processing part 210 notifies the user management part 202 of the provider's user ID included in the transaction request to instruct the user management part 202 to specify the provider terminal 3 of the provider that becomes the transaction partner. Receiving this, the user management part 202 searches the provider information storage part 222 for the record 2220 of the provider by using the provider's user ID as the key. Then, the user management part 202 notifies the transaction request processing part 210 of the address information of the provider terminal 3 included in the detected record 2220 (S3090).

Next, the transaction request processing part 210 notifies the transaction approval/disapproval inquiry part 209 of the object ID of the utilization control device 1 and the desire information on use of the usage target object, which are included in the transaction request, together with the address information notified from the user management part 202, and instructs the transaction approval/disapproval inquiry part 209 to make inquiry about the transaction approval/disapproval. Receiving this, the transaction approval/disapproval inquiry part 209 generates a transaction approval/disapproval inquiry that includes the object ID of the utilization control device 1 and the desire information on use of the usage target object, and sends the transaction approval/disapproval inquiry via the WAN interface part 200 to the provider terminal 3 specified by the address information notified from the user management part 202 (S3091). Then, when a response to the transaction approval/disapproval inquiry is received (YES in S3092), the transaction approval/disapproval inquiry part 209 notifies the transaction request processing part 210 of the received response.

Next, when the response to the transaction approval/disapproval inquiry is a transaction rejection response (NO in S3093), the transaction request processing part 210 performs error processing such as sending of an error message to the user terminal 4 as the sender of the transaction request via the WAN interface part 200 (S3097).

On the other hand, when the response to the transaction approval/disapproval inquiry is a transaction acceptance response (YES in S3093), the transaction request processing part 210 determines that the transaction has been established, issues a transaction ID, and determines a user permit obtainable time based on the usable period start time in the desire information on use of the usage target object included in the transaction request (S3094). For example, the time 24 hours before the desired start time of use is determined as the user permit obtainable time.

Then, the transaction request processing part 210 generates transaction information that includes the transaction ID, the user's user ID, and the provider's user ID, the object ID, and the desire information on use included in the transaction request, and the use permit obtainable time. Then, the transaction request processing part 210 instructs the transaction management part 205 to manage the transaction information generated. Receiving this, the transaction management part 205 adds a record 2250 of transaction information to the transaction information storage part 225, and registers the transaction information (the transaction ID, the object ID, the user's user ID, the provider's user ID, the desire information on use, and the use permit obtainable time) in the record 2250 (S3095).

Next, the transaction request processing part 210 sends a transaction establishment notice that includes the use permit obtainable time to the user terminal 4 as the sender of the transaction request (S3096).

Figure 19:
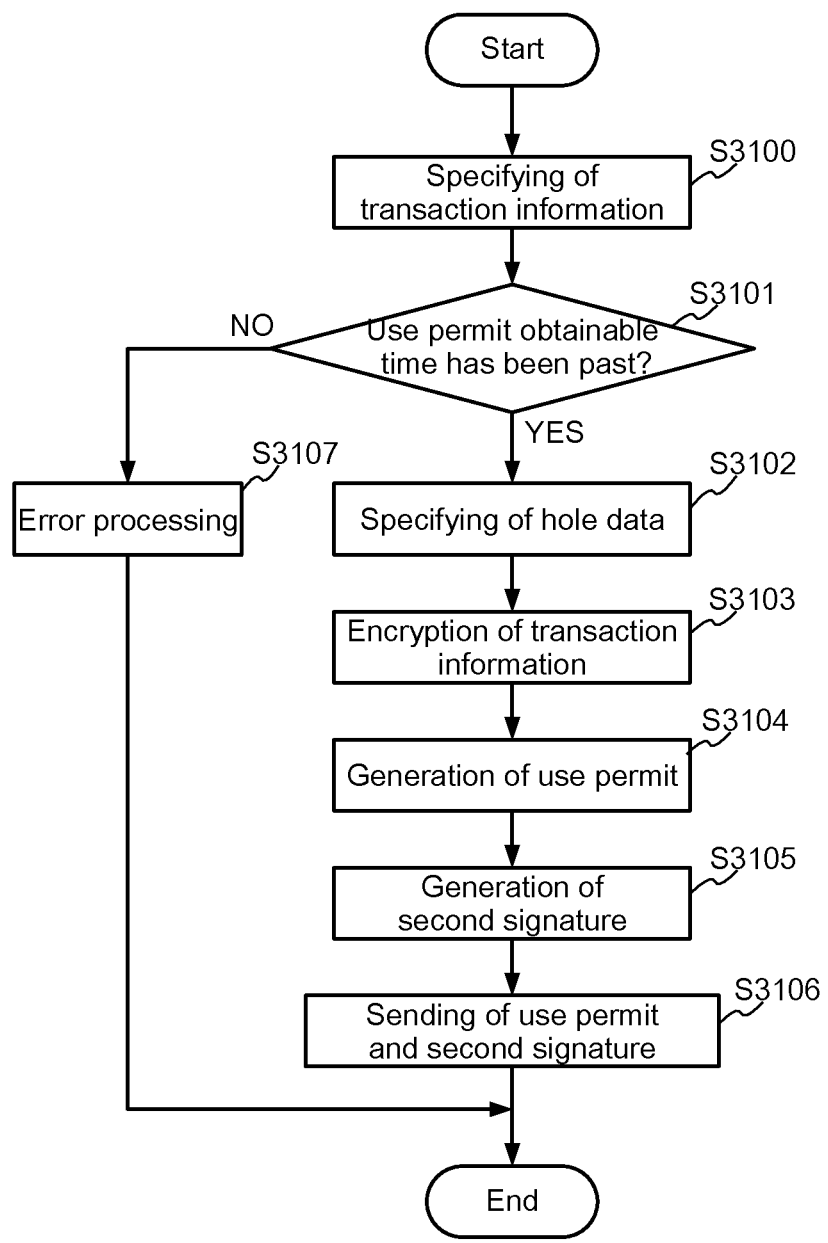
FIG. 19 is a flowchart for explaining the use permit request processing S310 shown in FIG. 15.

FIG. 19 is a flowchart for explaining the use permit request processing S310 shown in FIG. 15.

First, the use permit request processing part 211 notifies the transaction management part 205 of the transaction ID included in the use permit request to instruct the transaction management part 205 to search for the transaction information. Receiving this, the transaction management part 205 searches the transaction information storage part 225 for the record 2250 of the transaction information by using the transaction ID as the key. Then, the transaction management part 205 notifies the use permit request processing part 211 of the transaction information registered in the record 2250 (S3100).

Next, the use permit request processing part 211 confirms that the user's user ID included in the transaction information notified from the transaction management part 205 is the user ID of the user of the user terminal 4 as the sender of the use permit request notified from the login processing part 206, and confirms that the use permit obtainable time included in the transaction information has been past (S3101).

In the case where the user's user ID included in the transaction information is not the user ID of the user of the user terminal 4 as the sender of the user permit request or where the use permit obtainable time has not been past (NO in S3101), the use permit request processing part 211 performs predetermined error processing such as sending of an error message via the WAN interface part 200 to the user terminal 4 as the sender of the user permit request (S3107).

On the other hand, in the case where the user's user ID included in the transaction information is the user ID of the user of the user terminal 4 as the sender of the use permit request and the use permit obtainable time included in the transaction information has been past (YES in S3101), the use permit request processing part 211 notifies the hole management part 204 of the object ID included in the transaction information to instruct the hole management part 204 to search for the common key and the second secret key. Receiving this, the hole management part 204 searches the hole data storage part 224 for the record 2240 of the hole data by using the object ID as the key. Then, the hole management part 204 notifies the use permit request processing part 211 of the common key and the second secret key included in the detected record 2240 (S3102).

Next, the use permit request processing part 211 encrypts the transaction information by using the common key notified from the hole management part 204 (S3103), and generates a use permit that includes the encrypted transaction information (S3104). Then, the use permit request processing part 211 generates a second signature on the use permit by using the second secret key notified from the hole management part 204 (S3105).

Next, the use permit request processing part 211 sends the use permit and the second signature to the user terminal 4 as the sender of the use permit request (S3106).

Hereinafter, one embodiment of the present invention has been described.

In the present embodiment, the utilization control device 1 can communicate only via the Near Field Communication 63, and is separated from the WAN 60. Accordingly, the utilization control device 1 is not attacked from the outside via the WAN 60. Further, the use permit used for lifting the restriction on use of the house 50 as the usage target object is validated by verifying the second signature added to the use permit by using the second public key included in the hole data. Further, the hole data is validated by verifying the first signature added to the hole data by using the first public key. Thus, according to the present embodiment, it is possible to reduce security risk.

Further, in the present embodiment, the restriction on use of the usage target object is lifted only when the desire information on use in the transaction information included in the use permit is satisfied, and otherwise the restriction on use of the usage target object is not lifted. Accordingly, by including conditions such as a time limit for use, the number of times of use, and the like, in the desire information on use in the transaction information, the use permit that does not satisfy the conditions becomes invalid even though it has been authenticated. As a result, it is not necessary for the user of the usage target object (user of the user terminal 4) to return the use permit. Thus, according to the present embodiment, convenience is improved.

Thus, according to the present embodiment, it is possible to improve convenience while reducing security risks in use management of usage target object.

Further, in the present embodiment, the management device 2 manages transaction information that includes a use permit obtainable time. On receiving a use permit request from the user terminal 4, the management device 2 generates a use permit when the use permit obtainable time included in the transaction information specified by the transaction ID designated by the use permit request has been past. Thus, by setting time restriction for obtaining a use permit, it is possible to reduce room for falsifying the use permit and to improve security further.

Further, in the present embodiment, when the management device 2 receives a use request from the user terminal 4, the management device 2 sends a transaction approval/disapproval inquiry that includes the desire information on use included in the use request to the provider terminal 3. Then, when the management device 2 receives a transaction acceptance response as a response to the transaction approval/disapproval inquiry from the provider terminal 3, the management device 2 generates transaction information, and sends to the user terminal 4 a transaction establishment notice that includes the use permit obtainable time included in the transaction information. Accordingly, the provider can show his will of transaction for each transaction (providing) of services for using the usage target object, and the user can know the use permit obtainable time in the case of establishment of the transaction. Thus, convenience of both the provider of the services for using the usage target object and the user is further improved.

The present invention is not limited to the above embodiment, and can be changed variously within the scope of the invention.

For example, in the above embodiment, a common key shared between the management device 2 and the utilization control device 1 is used. Using the common key, the management device 2 encrypts transaction information that is included in a use permit to be sent to the user terminal 4, and the utilization control device 1 decrypts the encrypted transaction information included in the use permit received from the user terminal 4. The present invention, however, is not limited to this. Without being encrypted, a plain text of transaction information may be sent from the management device 2 to the utilization control device 1 via the user terminal 4.

Further, the above embodiment has been described by taking an example where the usable period start and end times and the number of times of use are used as the desire information on use to be included in transaction information. The present invention, however, is not limited to this. It is sufficient that the desire information on use designates conditions for lifting the restriction on use of the usage target object, and thus the desire information on use may include either the usable period start and end times or the number of times of use. Or, instead of the usable period start and end times and the number of times of use, or instead of either the usable period start and end times or the number of times of use, the desire information on use may include other conditions. For example, the desire information on use may include the usable period start and end times and a list of IDs of users whose use are permitted.

Figure 20:
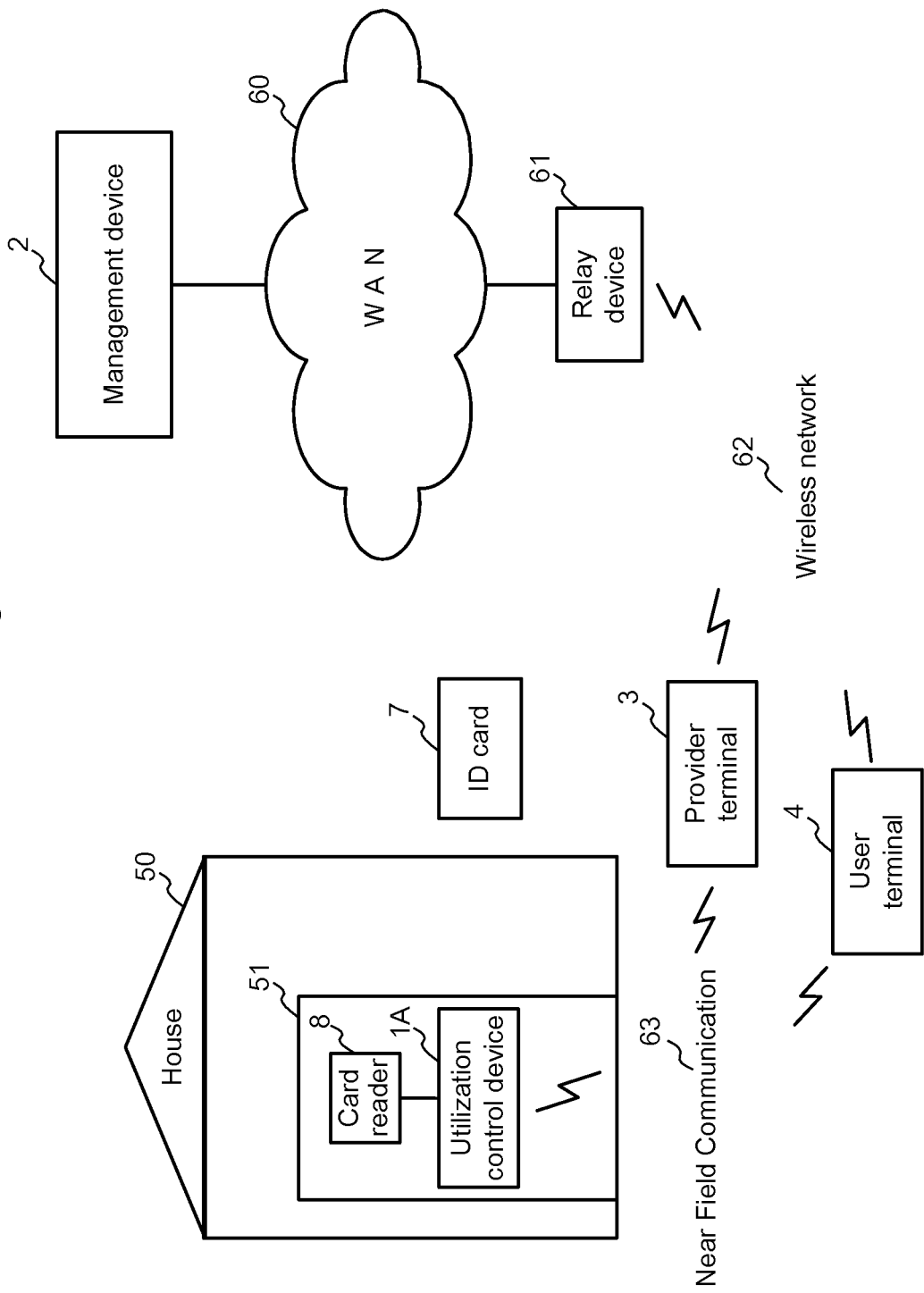
FIG. 20 is a schematic configuration diagram showing a variation of the utilization management system shown in FIG. 1.

FIG. 20 is a schematic configuration diagram showing a variation of the utilization management system shown in FIG. 1.

The variation shown in FIG. 20 is different from the utilization management system shown in FIG. 1 in that an ID card 7 and a card reader 8 are added and that a utilization control device 1A is provided instead of the utilization control device 1. The other configuration of the variation shown in FIG. 20 is similar to the utilization management system shown in FIG. 1.

The ID card 7 is given to a person, such as a family member or a friend, having relation to a user who enjoys services for using the usage target object (house 50), and the ID card 7 stores a unique permission ID. The card reader 8 is connected to the utilization control device 1A, and sends the permission ID read from the ID card 7 to the utilization control device 1A. The utilization control device 1A has a card reader interface part for connecting to the card reader 8. The other configuration of the utilization control device 1A is similar to the utilization control device 1 shown in FIG. 7.

FIG. 21 is a sequence diagram showing an example of a use restriction lift operation for the utilization control device 1A to lift restriction on use of the usage target object in the utilization management system's variation shown in FIG. 20.

In the utilization management system's variation shown in FIG. 20, object registration operation and hole setting operation are similar to the object registration operation and the hole setting operation shown in FIGS. 2 and 3. Further, transaction information registration operation and use permit issue operation are similar to the transaction registration operation and the use permit issue operation shown in FIGS. 4 and 5 except that desire information on use includes a list of permission IDs instead of the number of times of use. Accordingly, detailed description of these operations will be omitted.

It is assumed that it is after the usable period start time included in the desire information on use of the transaction information included in the transaction establishment notice received by the user terminal 4 from the management device 2 (S400). When the user terminal 4 receives a use operation from the user who recognizes that the present date is within the period specified by the usable period start and end times included in the desire information on use in the transaction information in a state that the user terminal 4 is close to the utilization control device 1A installed in the usage target object (house 50), which the user desires to receive the services of using, at a distance that allows the Near Field Communication 63 with the utilization control device 1A (S401), the user terminal sends the use permit and the second signature received from the management device 2 via the Near Field Communication 63 to the utilization control device 1A (S402).

Receiving this, the utilization control device 1A verifies the second signature on the use permit received from the user terminal 4 by using the second public key included in the hole data set in the utilization control device 1a itself (S403). When the signature verification is established, the utilization control device 1A decrypts the encrypted transaction information included in the use permit by using the common key included in the hole data (S404).

Next, the utilization control device 1A specifies the desire information on use included in the decrypted transaction information, and confirms that the present date is within the period specified by the usable period start and end times included in the desire information on use (S405). When it is confirmed that the present date is within the period specified by the usable period start and end times included in the desire information on use, the utilization control device 1A determines that preparation is complete for lifting the restriction on use of the usage target object (S406), and sends a use restriction lifting preparation notice to the user terminal 4 via the Near Field Communication (S407).

Next, when the card reader 8 receives a read operation for making the card reader 8 read the permission ID stored in the card 7 from a person (such as a family member or a friend) having relation to the user (S408), the card reader 8 reads the permission ID and sends the permission ID to the utilization control device 1A (S409).

Receiving this, the use restriction lifting part 14 of the utilization control device 1A confirms that the present date is within the period specified by the usable period start and end times included in the desire information on use, and confirms that the permission ID received from the card reader 8 via the card reader interface part exists in the list of permission IDs included in the desire information on use (S410). When it is confirmed that these conditions are satisfied, the use restriction lifting part 14 lifts the restriction on use of the usage target object (S411). Here, the use restriction lifting part 14 unlocks the automatic lock of the entrance 51 of the house 50 as the usage target object.

Here, in the above-described variation of utilization management system, the desire information on use may include biometric authentication information such as fingerprints, veins, an irises, or the like of users who are permitted to use instead of the list of IDs of users who are permitted. In this case, in FIG. 20, instead of the ID card 7 and the card reader 8, a biometric reader is connected to the utilization control device 1A. Further, in S408 and S409 of FIG. 21, when the biometric reader receives a read operation for making the biometric reader read biometric authentication information from the person (family member, friend, or the like) having relation to the user, the biometric reader sends the read biometric authentication information to the utilization control device 1A. Then, in S410, the use restriction lifting part 14 of the utilization control device 1A confirms that the present date is within the period specified by the usable period start and end times included in the desire information on use, and confirms that the biometric authentication information received from the biometric reader is registered in a list of biometric authentication information included in the desire information on use.

Further, in the above embodiment, the storage part 201 is placed in the management device 2. The present invention, however, is not limited to this. The storage part 201 may be held by a file server connected to the WAN 60. In this case, the user information storage part 221, the provider information storage part 222, the object data storage part 223, the hole data storage part 224, and the transaction information storage part 225 may be held by respective different file servers. Or, each part may be divided into a plurality of parts that are held by a plurality of file servers in a distributed manner. Further, it is favorable that the information stored in these storage parts 221-225 is protected by using the blockchain technology or the like.

Further, the above embodiments are described by taking examples where the utilization control device 1, 1A is used for unlocking the automatic lock installed at the entrance 51 of the house 50 as the usage target object. The present invention, however, is not limited to this. It is possible that a usage target object is a hotel, an inn, a guesthouse, a warehouse, a room, or the like, and the utilization control device 1, 1A is used for unlocking an automatic lock installed at an entrance of such a usage target object. Or, it is possible that a usage target object is a moving body such as an automobile or a bicycle, and the utilization control device 1, 1A is used for unlocking a door of the moving body or for turning on an ignition. Or, it is possible that a usage target object is a browsing terminal for an electronic medium of, for example, an electronic medical record, an electronic book, or the like, and the utilization control device 1, 1A is used for lifting restriction on access to the electronic medium or for decrypting an encrypted electronic medium.

REFERENCE SIGNS LIST 1, 1A: utilization control device; 2: management device; 3: provider terminal; 4: user terminal; 7: ID card; 8: card reader; 10: Near Field Communication part; 11: setting information etcetera storage part; 12: object setting part; 13: hole setting part; 14: use restriction lifting part; 15: signature verification part; 16: decryption part; 50: house; 51: entrance; 60: WAN; 61: relay device; 62: wireless network; 63: Near Field Communication; 200: WAN interface part; 201: storage part; 202: user management part; 203: object management part; 204: hole management part; 205: transaction management part; 206: login processing part; 207: object registration request processing part; 208: hole generation request processing part; 209: transaction approval/disapproval inquiry part; 210: transaction request processing part; 211: use permit request processing part; 221: user information storage part; 222: provider information storage part; 223: object data storage part; 224: hole data storage part; and 225: transaction information storage part.

The invention claimed is:

1. A utilization management system configured to manage use of a usage target object, comprising:
   a utilization control device configured to control use of the usage target object by locking/unlocking, access control or encrypting/decrypting based on a use permit;
   a management device configured to manage the usage target object by association with the utilization control device;
   a provider terminal configured to set hole data required for verification of the use permit in the utilization control device; and
   a user terminal configured to notify the utilization control device of the use permit,
   wherein the management device: comprises at least one processor configured to execute a computer readable instruction so as to:
      manage transaction information including conditions for using the usage target object,
      manage a first secret key and a pre-registered first public key associated with the utilization control device,
      manage a second secret key and a second public key associated with the utilization control device,
      generate a first signature for the hole data by using the first secret key and send the hole data with the first signature to the provider terminal, the hole data including the second public key, and
      generate a second signature for the use permit by using the second secret key and send the use permit with the second signature to the user terminal, the use permit including the transaction information,
   wherein the provider terminal is configured to send the hole data with the first signature received from the management device to the utilization control device via Near Field Communication,
   wherein the user terminal is configured to send the use permit with the second signature received from the management device to the utilization control device via the Near Field Communication,
   wherein the utilization control device is configured to communicate only via the Near Field Communication, and comprises at least one processor configured to execute a computer readable instruction so as to:
      verify the first signature received together with the hole data from the provider terminal by using the pre-registered first public key and set the hole data in the utilization control device when the first signature and the hole data have been verified,
      verify the second signature received together with the use permit from the user terminal by using the second public key included in the hole data set in the utilization control device and obtain the transaction information included in the use permit when the second signature and the use permit have been verified, and
      lift a restriction on use of the usage target object by referring to the transaction information when conditions specified by the transaction information are satisfied.

2. The utilization management system according to claim 1, wherein the at least one processor of the management device is configured to execute the computer readable instruction so as to manage the transaction information with a use permit obtainable time being included in the transaction information, and
   when a use permit request accompanied by a designation of the transaction information is received from the user terminal and it is after the use permit obtainable time included in the transaction information designated by the use permit request:
   generate the use permit that includes the transaction information,
   generate the second signature for the use permit by using the second secret key managed by the management device, and send the use permit and the second signature to the user terminal.

3. The utilization management system according to claim 2, wherein
   the at least one processor of the management device is configured to further execute the computer readable instruction so as to:
   send to the provider terminal a transaction approval/disapproval inquiry that includes conditions on use of the usage target object and that inquiries about a transaction approval/disapproval of services for using the usage target object, when a use request that includes the conditions on use of the usage target object is received from the user terminal, and
   generate the transaction information that includes the conditions on use of the usage target object included in the transaction approval/disapproval inquiry and the use permit obtainable time and send a transaction establishment notice that includes the use permit obtainable time to the user terminal, when a transaction acceptance response is received from the provider terminal as a response to the transaction approval/disapproval inquiry to the provider terminal.

4. The utilization management system according to claim 1, wherein
   the at least one processor of the management device is further configured to execute the computer readable instruction so as to:
   when a hole generation request accompanied by designation of the utilization control device is received from the provider terminal,
      generate the second secret key and the second public key,
      generate, according to the hole generation request, the first signature for the hole data that includes the second public key by using the first secret key, and send the hole data and the first signature to the provider terminal.

5. The utilization management system according to claim 2, wherein the at least one processor of the management device is further configured to execute the computer readable instruction so as to:
when a hole generation request accompanied by designation of the utilization control device is received from the provider terminal,
generate the second secret key and the second public key,
generate, according to the hole generation request, the first signature for the hole data that includes the second public key by using the first secret key, and
send the hole data and the first signature to the provider terminal.

6. The utilization management system according to claim 3, wherein the at least one processor of the management device is further configured to execute the computer readable instruction so as to:
when a hole generation request accompanied by designation of the utilization control device is received from the provider terminal,
generate the second secret key/public key,
generate, according to the hole generation request, the first signature for the hole data that includes the second public key by using the first secret key, and
send the hole data and the first signature to the provider terminal.

7. The utilization management system according to claim 1, wherein
the at least one processor of the management device is further configured to execute the computer readable instruction so as to:
generate the first secret key and the first public key and send an object registration notice that includes the first public key to the provider terminal, when an object registration request accompanied by designation of the utilization control device is received from the provider terminal,
wherein the provider terminal is configured to send the object registration notice received from the management device to the utilization control device via the Near Field Communication, and
wherein the at least one processor of the utilization control device is further configured to execute the computer readable instruction so as to register the first public key included in the object registration notice received from the provider terminal.

8. The utilization management system according to claim 2, wherein
the at least one processor of the management device is further configured to execute the computer readable instruction so as to:
generate the first secret key and the first public key and send an object registration notice that includes the first public key to the provider terminal, when an object registration request accompanied by designation of the utilization control device is received from the provider terminal,
wherein the provider terminal is configured to send the object registration notice received from the management device to the utilization control device via the Near Field Communication, and
wherein the at least one processor of the utilization control device is further configured to execute the computer readable instruction so as to register the first public key included in the object registration notice received from the provider terminal.

9. The utilization management system according to claim 3, wherein
the at least one processor of the management device is further configured to execute a computer readable instruction so as to:
generate the first secret key and the first public key and send an object registration notice that includes the first public key to the provider terminal, when an object registration request accompanied by designation of the utilization control device is received from the provider terminal,
wherein the provider terminal is configured to send the object registration notice received from the management device to the utilization control device via the Near Field Communication, and
the at least one processor of the utilization control device is further configured to execute the computer readable instruction so as to register the first public key included in the object registration notice received from the provider terminal.

10. The utilization management system of according to claim 1, wherein
the at least one processor of the management device is further configured to execute the computer readable instruction so as to:
also manage a common key by association with the utilization control device,
send the hole data with the common key being included in the hole data, and
use the common key to encrypt the transaction information to be included in the use permit, and
wherein the at least one processor of the utilization control device is further configured to execute the computer readable instruction so as to use the common key included in the hole data that is set in the utilization control device to decrypt the encrypted transaction information included in the use permit.

11. The utilization management system of according to claim 2, wherein
the at least one processor of the management device is further configured to execute the computer readable instruction so as to:
also manage a common key by association with the utilization control device,
send the hole data with the common key being included in the hole data, and
use the common key to encrypt the transaction information to be included in the use permit, and
wherein the at least one processor of the utilization control device is further configured to execute the computer readable instruction so as to use the common key included in the hole data that is set in the utilization control device to decrypt the encrypted transaction information included in the use permit.

12. The utilization management system of according to claim 3, wherein
the at least one processor of the management device is further configured to execute the computer readable instruction so as to:
also manage a common key by association with the utilization control device send the hole data with the common key being included in the hole data, and
use the common key to encrypt the transaction information to be included in the use permit, and
the at least one processor of the utilization control device is further configured to execute the computer readable instruction so as to use the common key included in the hole data that is set in the utilization control device to decrypt the encrypted transaction information included in the use permit.

13. The utilization management system according to claim 1, further comprising an ID reader connected to the utilization control device, wherein
the at least one processor of the management device is further configured to execute the computer readable instruction so as to manage the transaction information that includes, as one of the conditions for using the usage target object, a list of permission IDs required for using the usage target object, and
wherein the at least one processor of the utilization control device is further configured to execute the computer readable instruction so as to, when the ID reader reads a permission ID from an ID storage medium, lift the restriction on use of the usage target object when the permission ID exists in the list of permission IDs included in the conditions specified by the transaction information and when the conditions specified by the transaction information other than the list are satisfied.

14. The utilization management system according to claim 2, further comprising an ID reader connected to the utilization control device, wherein
the at least one processor of the management device is further configured to execute a computer readable instruction so as to manage the transaction information that includes, as one of the conditions for using the usage target object, a list of permission IDs required for using the usage target object, and
wherein the at least one processor of the utilization control device is further configured to execute the computer readable instruction so as to, when the ID reader reads a permission ID from an ID storage medium, lift the restriction on use of the usage target object when the permission ID exists in the list of permission IDs included in the conditions specified by the transaction information and when the conditions specified by the transaction information other than the list are satisfied.

15. The utilization management system according to claim 3, further comprising an ID reader connected to the utilization control device, wherein
the at least one processor of the management device is further configured to execute the computer readable instruction so as to manage the transaction information that includes, as one of the conditions for using the usage target object, a list of permission IDs required for using the usage target object, and
the at least one processor of the utilization control device is further configured to execute the computer readable instruction so as to, when the ID reader reads a permission ID from an ID storage medium, lift the restriction on use of the usage target object when the permission ID exists in the list of permission IDs included in the conditions specified by the transaction information and when the conditions specified by the transaction information other than the list are satisfied.

16. A management device for managing a utilization control device that controls, based on a use permit, use of a usage target object by locking/unlocking, access control, or encrypting/decrypting, the management device comprising:
at least one processor configured to execute a computer readable instruction so as to:
manage transaction information that includes conditions for using the usage target object,
manage a first secret key and a first public key associated with the utilization control devise,
manage a second secret key and a second public key associated with the utilization control device,
generate a first signature for hole data required for verification of the use permit and including the second public key by using the first secret key to send the hole data and the first signature to a provider terminal setting the hole data to the utilization control device, and
generate a second signature for the use permit including the transaction information by using the second secret key to send the use permit and the second signature to a user terminal notifying the utilization control device of the use permit.

17. A utilization control device configured to control use of a usage target object by locking/unlocking, access control, or encrypting/decrypting, based on a use permit, the utilization control device comprising:
at least one processor configured to execute a computer readable instruction so as to:
verify a first signature received together with hole data required for verification of the use permit from a provider terminal by using a pre-registered first public key to set the hole data in the utilization control device when verification is established, and
verify a second signature received together with the use permit from a user terminal by using a second public key included in the hole data set in the utilization control device to refer to transaction information included in the use permit when verification is established and to lift restriction on use of the usage target object when conditions specified by the transaction information are satisfied,
wherein the utilization control device is configured to communicate only via Near Field Communication.

18. A utilization management method for managing use of a usage target object by using: a utilization control device that controls use of the usage target object by locking/unlocking, access control, or encrypting/decrypting based on a use permit; a management device that manages the usage target object by association with the utilization control device; a provider terminal that sets hole data required for verification of the use permit in the utilization control device; and a user terminal that notifies the utilization control device of the use permit, wherein
the management device:
manages transaction information including conditions for using the usage target object, and manages a first secret key/public key and a second secret key/public key in association with the utilization control device;
generates a first signature for the hole data including the second public key by using the first secret key to send the hole data and the first signature to the provider terminal; and
generates a second signature for the use permit including the transaction information by using the second secret key to send the use permit and the second signature to the user terminal;
the provider terminal sends the hole data and the first signature received from the management device to the utilization control device via Near Field Communication;
the user terminal sends the use permit and the second signature received from the management device to the utilization control device via the Near Field Communication;

the utilization control device:

communicates only via the Near Field Communication;

verifies the first signature received together with the hole data from the provider terminal by using a pre-registered first public key to set the hole data in the utilization control device when the verification being established; and verifies the second signature received together with the use permit from the user terminal by using the second public key included in the hole data set in the utilization control device to refer to the transaction information included in the use permit when the verification being established and to lift restriction on use of the usage target object if the conditions specified by the transaction information being satisfied.

19. A computer program product embodying computer readable instructions stored on a non-transitory computer readable medium configured to cause a computer to function as a management device that manages a utilization control device for controlling use of a usage target object by locking/unlocking, access control, or encrypting/decrypting based on a use permit, wherein the computer executes the computer readable instructions so as to:

manage transaction information including conditions for using the usage target object, manage a first secret key and a first public key in association with the utilization control device, manage a second secret key and a second public kay key associated with the utilization control device;

generate a first signature for hole data required for verification of the use permit and including the second public key managed by using the first secret key to send the hole data and the first signature to a provider terminal setting the hole data to the utilization control device, and generate a second signature for the use permit including the transaction information by using the second secret key to send the use permit and the second signature to a user terminal notifying the utilization control device of the use permit.

20. A computer program product embodying computer readable instructions stored on a non-transitory computer readable medium configured to cause a computer to function as a utilization control device that controls use of a usage target object by locking/unlocking, access control, or encrypting/decrypting, based on a use permit and communicates only via Near Field Communication, wherein the computer executes the computer readable instructions so as to:

verify a first signature received together with hole data from a provider terminal by using a pre-registered first public key to set the hole data in the utilization control device when verification is established, verify a second signature received together with a use permit from a user terminal by using a second public key included in the hole data set in the utilization control device to refer to transaction information included in the use permit when verification is established, and lift a restriction on use of the usage target object by referring to the transaction information when conditions specified by the transaction information are satisfied.

* * * * *